(12) United States Patent
Monden et al.

(10) Patent No.: US 9,745,722 B2
(45) Date of Patent: Aug. 29, 2017

(54) WORK VEHICLE AND METHOD OF CONTROLLING WORK VEHICLE

(71) Applicant: KOMATSU LTD., Tokyo (JP)

(72) Inventors: Hiroshi Monden, Hiratsuka (JP); Tatsuro Nohara, Erie, PA (US); Shogo Miyazaki, Hiratsuka (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/888,822

(22) PCT Filed: Nov. 25, 2014

(86) PCT No.: PCT/JP2014/081108
§ 371 (c)(1),
(2) Date: Nov. 3, 2015

(87) PCT Pub. No.: WO2015/093240
PCT Pub. Date: Jun. 25, 2015

(65) Prior Publication Data
US 2016/0083931 A1  Mar. 24, 2016

(30) Foreign Application Priority Data
Dec. 16, 2013  (JP) ................. 2013-259382

(51) Int. Cl.
*E02F 9/20* (2006.01)
*B60K 6/445* (2007.10)
(Continued)

(52) U.S. Cl.
CPC .......... *E02F 9/2079* (2013.01); *B60K 6/365* (2013.01); *B60K 6/387* (2013.01); *B60K 6/445* (2013.01);
(Continued)

(58) Field of Classification Search
CPC ....... E02F 9/2079; E02F 9/2066; E02F 3/283; B60K 6/445; B60K 6/365; B60K 6/387;
(Continued)

(56) References Cited

U.S. PATENT DOCUMENTS 6,226,584 B1 * 5/2001 Carlson ................. F16H 61/10
475/123
6,371,884 B1   4/2002 Channing
(Continued)

FOREIGN PATENT DOCUMENTS

CN   101189103 A   5/2008
CN   101310101 A   11/2008
(Continued)

OTHER PUBLICATIONS

The extended European search report for the corresponding European application No. 14871399.3, dated May 10, 2017.
(Continued)

*Primary Examiner* — Courtney Heinle
(74) *Attorney, Agent, or Firm* — Global IP Counselors, LLP

(57) ABSTRACT

A power transmission includes first and second clutches for switching a transmission path for a driving force. A work vehicle includes a clutch controlling unit and an engine controlling unit. The clutch controlling unit is configured to determine which of first and second modes the transmission path is switched into based on which of a range of greater than or equal to a mode switching threshold and a range of less than or equal to the mode switching threshold a speed ratio parameter falls into, and is configured to output a clutch command signal causing one of the first and second clutches to be engaged corresponding to the determined mode. The engine controlling unit is configured to apply an offset to a rotational speed of an input shaft such that after switching
(Continued)

into the determined mode, the speed ratio parameter deviates from the mode switching threshold in the switched mode.

7 Claims, 11 Drawing Sheets

(51) Int. Cl.

| | | |
|---|---|---|
| *B60L 11/14* | (2006.01) | |
| *F02D 29/04* | (2006.01) | |
| *B60L 7/14* | (2006.01) | |
| *F16H 61/10* | (2006.01) | |
| *F02D 41/02* | (2006.01) | |
| *B60L 7/26* | (2006.01) | |
| *B60L 11/00* | (2006.01) | |
| *B60L 11/12* | (2006.01) | |
| *B60L 15/20* | (2006.01) | |
| *B60K 6/365* | (2007.10) | |
| *B60K 6/387* | (2007.10) | |
| *B60K 6/547* | (2007.10) | |
| *B60K 6/38* | (2007.10) | |
| *B60K 17/08* | (2006.01) | |
| *E02F 3/28* | (2006.01) | |
| *F16H 61/26* | (2006.01) | |

(52) U.S. Cl.
CPC .............. *B60K 6/547* (2013.01); *B60K 17/08* (2013.01); *B60L 7/14* (2013.01); *B60L 7/26* (2013.01); *B60L 11/005* (2013.01); *B60L 11/123* (2013.01); *B60L 11/14* (2013.01); *B60L 15/2054* (2013.01); *E02F 3/283* (2013.01); *F02D 29/04* (2013.01); *F16H 61/26* (2013.01); *B60K 2006/381* (2013.01); *B60L 2200/40* (2013.01); *B60L 2240/12* (2013.01); *B60L 2240/36* (2013.01); *B60L 2240/421* (2013.01); *B60L 2240/423* (2013.01); *B60L 2240/441* (2013.01); *B60L 2240/443* (2013.01); *B60L 2240/486* (2013.01); *B60L 2240/507* (2013.01); *B60L 2250/24* (2013.01); *B60L 2250/26* (2013.01); *E02F 9/2066* (2013.01); *F02D 41/021* (2013.01); *F02D 41/0215* (2013.01); *F16H 61/10* (2013.01); *F16H 2200/2035* (2013.01); *Y02T 10/6217* (2013.01); *Y02T 10/6239* (2013.01); *Y02T 10/645* (2013.01); *Y02T 10/7022* (2013.01); *Y02T 10/7077* (2013.01); *Y02T 10/72* (2013.01); *Y02T 10/7275* (2013.01)

(58) Field of Classification Search
CPC .. B60K 6/547; B60K 17/08; B60K 2006/381; B60L 11/14; B60L 11/005; B60L 11/123; B60L 7/14; B60L 7/26; B60L 15/2054; B60L 2200/40; B60L 2250/24; B60L 2250/26; B60L 2240/36; B60L 2240/421; B60L 2240/423; B60L 2240/441; B60L 2240/443; B60L 2240/486; B60L 2240/507; B60L 2240/12; F02D 41/021; F02D 41/0215; F02D 29/04; F16H 61/26; F16H 61/10; F16H 2200/2035; Y02T 10/7077; Y02T 10/7022; Y02T 10/72; Y02T 10/645; Y02T 10/7275; Y02T 10/6239; Y02T 10/6217

See application file for complete search history.

(56) References Cited

U.S. PATENT DOCUMENTS

| | | | |
|---|---|---|---|
| 2003/0146028 A1 | 8/2003 | Kayano et al. | |
| 2009/0105028 A1 | 4/2009 | Hiraki et al. | |
| 2009/0118087 A1* | 5/2009 | Hsieh | B60L 15/2054 477/15 |
| 2009/0132131 A1 | 5/2009 | Takeda et al. | |
| 2009/0240406 A1 | 9/2009 | Fukushima et al. | |
| 2010/0078238 A1 | 4/2010 | Oba et al. | |
| 2012/0065854 A1* | 3/2012 | Stoller | F16H 61/702 701/60 |
| 2012/0108378 A1* | 5/2012 | Hiraki | B60K 6/445 475/78 |
| 2013/0020968 A1* | 1/2013 | Meyer | H02K 7/11 318/10 |
| 2013/0325270 A1* | 12/2013 | Beyer | F16H 61/10 701/51 |
| 2015/0315767 A1* | 11/2015 | Miyamoto | E02F 3/283 701/50 |
| 2015/0367851 A1* | 12/2015 | Yoshizawa | B60K 6/445 701/48 |
| 2016/0130786 A1* | 5/2016 | Miyamoto | E02F 9/2079 701/50 |
| 2016/0144720 A1* | 5/2016 | Nakabayashi | B60K 6/445 701/22 |
| 2016/0237651 A1* | 8/2016 | Miyamoto | E02F 9/2079 |

FOREIGN PATENT DOCUMENTS

| | | |
|---|---|---|
| JP | 2006-329244 A | 12/2006 |
| JP | 2013-537962 A | 10/2013 |

OTHER PUBLICATIONS

The International Search Report for the corresponding international application No. PCT/JP2014/081108, dated Mar. 3, 2015.

\* cited by examiner

WORK VEHICLE AND METHOD OF CONTROLLING WORK VEHICLE

CROSS-REFERENCE TO RELATED APPLICATIONS

This application is a U.S. National stage application of International Application No. PCT/JP2014/081108, filed on Nov. 25, 2014. This U.S. National stage application claims priority under 35 U.S.C. §119(a) to Japanese Patent Application No. 2013-259382, filed in Japan on Dec. 16, 2013, the entire contents of which are hereby incorporated herein by reference.

BACKGROUND

The present invention relates to a work vehicle and a method of controlling the work vehicle.

Background Information

Among work vehicles, such as a wheel loader, a type of work vehicle equipped with a power transmission including a torque converter and a multistage gearbox (hereinafter referred to as "a torque converter type transmission") has been widely known. On the other hand, in recent years, HMTs (hydro-mechanical transmissions) and EMTs (electro-mechanical transmissions) have been known as power transmissions that supersede the torque converter type transmissions.

As disclosed in Japan Laid-open Patent Application Publication No. 2006-329244, the HMTs include a gear mechanism and a motor connected to a rotary element of the gear mechanism. The HMTs are configured to convert part of a driving force from an engine into a hydraulic pressure and transmit the hydraulic pressure to a travelling apparatus, and is also configured to mechanically transmit the remainder of the driving force to the travelling apparatus.

To enable continuously variable speed change, the HMTs include, for instance, a planetary gear mechanism and a hydraulic motor. Among three elements composed of a sun gear, a carrier and a ring gear in the planetary gear mechanism, a first element is coupled to an input shaft, and a second element is coupled to an output shaft. Additionally, a third element is coupled to a hydraulic motor. The hydraulic motor is configured to function as either a motor or a pump in accordance with a travelling condition of the work vehicle. The HMTs are configured to continuously variably change the rotational speed of the output shaft by changing the rotational speed of the hydraulic motor.

On the other hand, the EMTs use an electric motor instead of the hydraulic motor used in the HMTs. The electric motor is configured to function as either a motor or an electric generator in accordance with a travelling condition of the work vehicle. Similarly to the HMTs, the EMTs are configured to continuously variably change the rotational speed of the output shaft by changing the rotational speed of the electric motor.

SUMMARY

Technical Problems

Some of HMTs or EMTs are capable of switching a power transmission path between two modes. It has been known that such a type of HMTs or EMTs configured to switch a plurality of modes can perform a wide range of speed ratio with a relatively small power transmission. Among the two modes, one is a mode for low speed travelling (hereinafter referred to as "a low speed (Lo) mode"), and the other is a mode for high speed travelling (hereinafter referred to as "a high speed (Hi) mode"). In general, mode switching is performed by engaging or disengaging clutches for establishing connection to the respective settings of transmission path. For example, the modes are switched in accordance with the speed ratio of the power transmission. The Lo mode is set when the speed ratio is less than or equal to a predetermined mode switching threshold. The Hi mode is set when the speed ratio is greater than the mode switching threshold.

However, while travelling is performed in a condition that the speed ratio of the work vehicle is kept at around the mode switching threshold, frequent mode switching may inevitably occur due to fluctuation of the vehicle speed caused by the influence of road surface and so forth. FIG. 15 shows variation in mode of the power transmission path in such a case.

In an example of FIG. 15, until time t1, the speed ratio is less than or equal to a mode switching threshold Rs_th1, and hence, the Lo mode is set. In a period from time t1 to time t2, the speed ratio is greater than or equal to the mode switching threshold Rs_th1, and hence, the Hi mode is set. In a period from time t2 to time t3, the speed ratio is less than or equal to the mode switching threshold Rs_th1, and hence, the Lo mode is set. At and after time t3, the speed ratio is greater than or equal to the mode switching threshold Rs_th1, and hence, the Hi mode is set.

Thus, when the speed ratio of the work vehicle varies around the mode switching threshold, the modes are switched in a short period of time. When the modes are switched, acute variation in torsion amount of a shaft inside a gear mechanism, variation in angle of a gear due to backlash, and variation in torsion amount of tires are caused by the influence of clutch engagement/disengagement. Thus, when the modes are frequently switched in a short period of time, i.e., a so called state of hunting, passing torque in clutch switching varies, which induces vibrations of the vehicle body. As a result, an operator increasingly feels uncomfortable.

It is an object of the present invention to provide a work vehicle in which a power transmission of an HMT or EMT type has a plurality of settings of transmission path for a driving force and which inhibits hunting that is frequently switching between the settings of transmission path, and to provide a method of controlling the work vehicle.

A work vehicle according to a first aspect of the present invention includes an engine, a hydraulic pump, a work implement, a travelling apparatus, a power transmission and a controller. The hydraulic pump is configured to be driven by the engine. The work implement is configured to be driven by a hydraulic oil discharged from the hydraulic pump. The travelling apparatus is configured to be driven by the engine. The power transmission is configured to transmit a driving force from the engine to the travelling apparatus. The controller is configured to control the power transmission.

The power transmission includes an input shall, an output shall, a gear mechanism, a motor, a first clutch and a second clutch. The gear mechanism has a planetary gear mechanism and is configured to transmit a rotation of the input shaft to the output shaft. The motor is connected to a rotary element of the planetary gear mechanism. The first clutch is configured to switch a transmission path for the driving force in the power transmission into a first mode. The second clutch is configured to switch the transmission path for the driving force in the power transmission into a second mode. When the transmission path is set in the first mode, the first clutch is configured to be engaged and the second clutch is configured to be disengaged. When the transmission path is set in the second mode, the second clutch is configured to be engaged and the first clutch is configured to be disengaged.

In the power transmission, a rotational speed of the motor varies, thereby a speed ratio of the output shaft to the input shaft varies. When a speed ratio parameter corresponding to the speed ratio is a predetermined mode switching threshold, a rotational speed ratio of the motor to the input shaft in the first mode and a rotational speed ratio of the motor to the input shaft in the second mode becomes equal.

The controller includes a clutch controlling unit and an engine controlling unit. The clutch controlling unit is configured to determine which of the first mode and the second mode the transmission path is switched into based on whether the speed ratio parameter is greater than or equal to the mode switching threshold, or the speed ratio parameter is less than or equal to the mode switching threshold and then output a clutch command signal for causing one of the first and second clutches to be engaged correspondingly to the determined mode. The engine controlling unit is configured to apply an offset to a rotational speed of the input shaft such that after switching into the determined mode, the speed ratio parameter deviates from the mode switching threshold in the switched mode. A horsepower outputted by the engine is kept unchanged before and after the engine controlling unit applies the offset to the rotational speed of the input shaft.

The engine controlling unit may be configured to set the offset to have a positive value when the speed ratio parameter exists in a range of less than or equal to the mode switching threshold in the determined mode. On the other hand, the engine controlling unit may be configured to set the offset to have a negative value when the speed ratio parameter exists in a range of greater than or equal to the mode switching threshold in the determined mode.

In changing the rotational speed of the input shaft, the engine controlling unit may be configured to increase a rotational speed of the engine and decrease an output torque of the engine. Alternatively, the engine controlling unit may be configured to decrease the rotational speed of the engine and increase the output torque of the engine.

The engine controlling unit may be configured to finish applying the offset when the speed ratio deviates from the mode switching threshold by a predetermined magnitude or greater.

A control method according to a second aspect of the present invention is a method of controlling a work vehicle equipped with a power transmission. The power transmission includes an input shaft, an output shaft, a gear mechanism, a motor, a first clutch and a second clutch. The gear mechanism has a planetary gear mechanism and is configured to transmit a rotation of the input shaft to the output shaft. The motor is connected to a rotary element of the planetary gear mechanism. The first clutch is configured to switch a transmission path for a driving force in the power transmission into a first mode. The second clutch is configured to switch the transmission path for the driving force in the power transmission into a second mode. When the transmission path is set in the first mode, the first clutch is configured to be engaged and the second clutch is configured to be disengaged. When the transmission path is set in the second mode, the second clutch is configured to be engaged and the first clutch is configured to be disengaged.

In the power transmission, a rotational speed of the motor varies, thereby a speed ratio of the output shaft to the input shaft varies. Preferably, when a speed ratio parameter corresponding to the speed ratio is a predetermined mode switching threshold, a rotational speed ratio of the motor to the input shaft in the first mode and a rotational speed ratio of the motor to the input shaft in the second mode may become equal.

The control method includes a step of determining which of the first mode and the second mode the transmission path is switched into based on whether the speed ratio parameter is greater than or equal to the mode switching threshold, or the speed ratio parameter is less than or equal to the mode switching threshold and then outputting a clutch command signal for causing one of the first and second clutches to be engaged correspondingly to the determined mode. Furthermore, the control method includes a step of keeping unchanged a horsepower outputted by the engine and simultaneously applying an offset to a rotational speed of the input shaft such that after switching into the determined mode, the speed ratio parameter deviates from the mode switching threshold in the switched mode.

In the work vehicle and the control method according to the present invention, the horsepower outputted by the engine is kept unchanged, and simultaneously, the offset is applied to the rotational speed of the input shaft such that after switching into the determined mode, the speed ratio parameter deviates from the mode switching threshold in the switched mode. As a result, the speed ratio is unlikely to reach the mode switching threshold even when varying after mode switching is performed. Therefore, it is possible to provide a work vehicle having a power transmission of an HMT or EMT type and a plurality of settings of transmission path for a driving force which inhibits hunting to be caused by frequently switching between the settings of transmission path, and to provide a method of controlling the work vehicle.

DETAILED DESCRIPTION OF EXEMPLARY EMBODIMENTS

First Exemplary Embodiment

Figure 1:
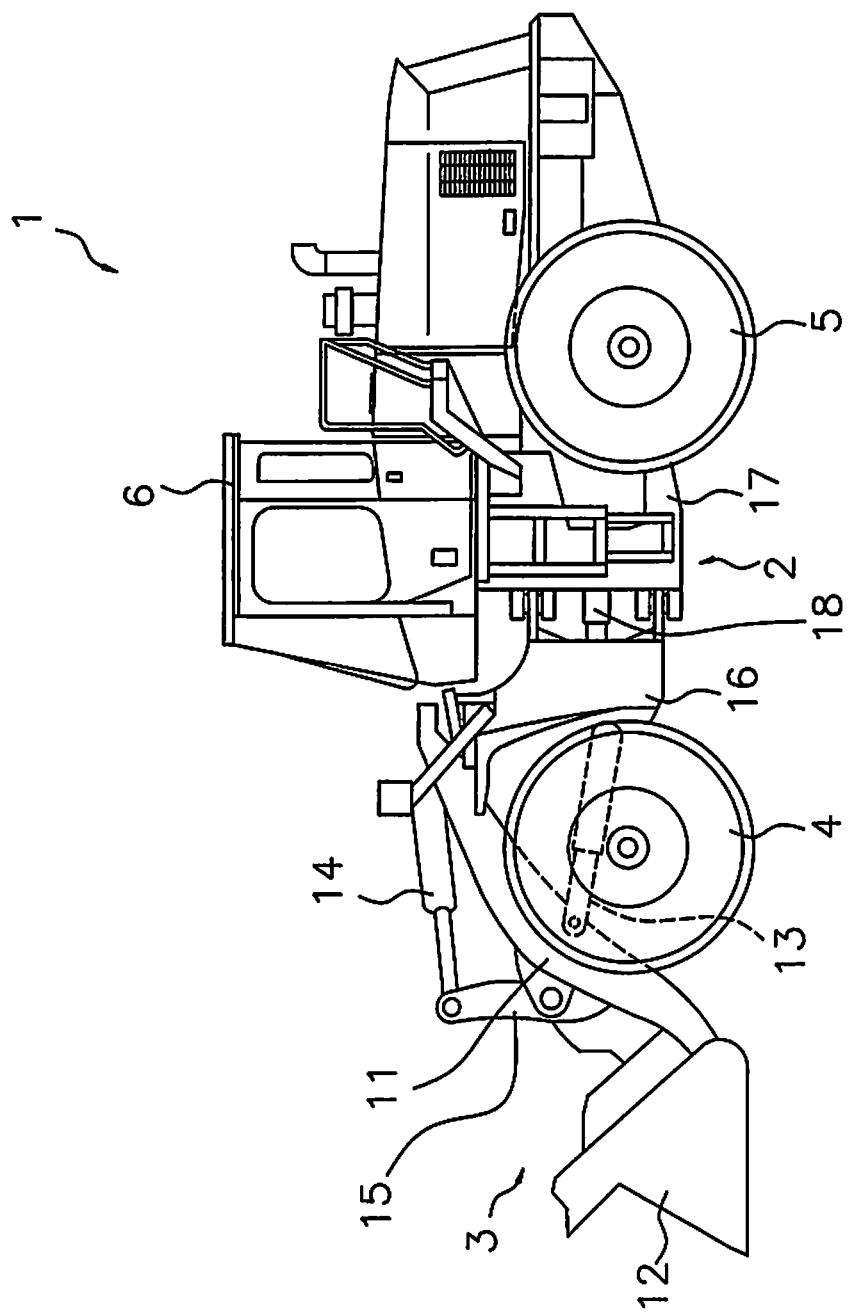
FIG. 1 is a side view of a work vehicle according to an exemplary embodiment.

Exemplary embodiments of the present invention will be hereinafter explained with reference to drawings. FIG. 1 is a side view of a work vehicle 1 according to a first exemplary embodiment of the present invention. As shown in FIG. 1, the work vehicle 1 includes a vehicle body frame 2, a work implement 3, travelling wheels 4 and 5, and a cab 6. The work vehicle 1 is a wheel loader and is configured to travel when the travelling wheels 4 and 5 are driven and rotated. The work vehicle 1 is capable of performing works such as digging with use of the work implement 3.

The vehicle body frame 2 includes a front frame 16 and a rear frame 17. The front frame 16 and the rear frame 17 are attached to each other so as to be capable of pivoting in the right-and-left direction. The work implement 3 and the travelling wheels 4 are attached to the front frame 16. The work implement 3 is driven by hydraulic oil from a work implement pump 23 to be described (see FIG. 2). The work implement 3 includes a boom 11 and a bucket 12. The boom 11 is mounted to the vehicle body frame 2. The work implement 3 includes a lift cylinder 13 and a bucket cylinder 14. The lift cylinder 13 and the bucket cylinder 14 are hydraulic cylinders. One end of the lift cylinder 13 is attached to the front frame 16. The other end of the lift cylinder 13 is attached to the boom 11. When the lift cylinder 13 is extended and contracted by the hydraulic oil from the work implement pump 23, the boom 11 is configured to turn up and down. The bucket 12 is attached to the tip end of the boom 11. One end of the bucket cylinder 14 is attached to the vehicle body frame 2. The other end of the bucket cylinder 14 is attached to the bucket 12 through a bellcrank 15. When the bucket cylinder 14 is extended and contracted by the hydraulic oil from the work implement pump 23, the bucket 12 is configured to turn up and down.

The cab 6 and the travelling wheels 5 are attached to the rear frame 17. The cab 6 is mounted onto the vehicle body frame 2. A seat on which an operator is seated, an operating device to be described and so forth are disposed within the cab 6.

The work vehicle 1 includes a steering cylinder 18. The steering cylinder 18 is attached to the front frame 16 and the rear frame 17. The steering cylinder 18 is a hydraulic cylinder. When the steering cylinder 18 is extended and contracted by the hydraulic oil from a steering pump 28 to be described, the moving direction of the work vehicle 1 is configured to be changed right and left.

Figure 2:
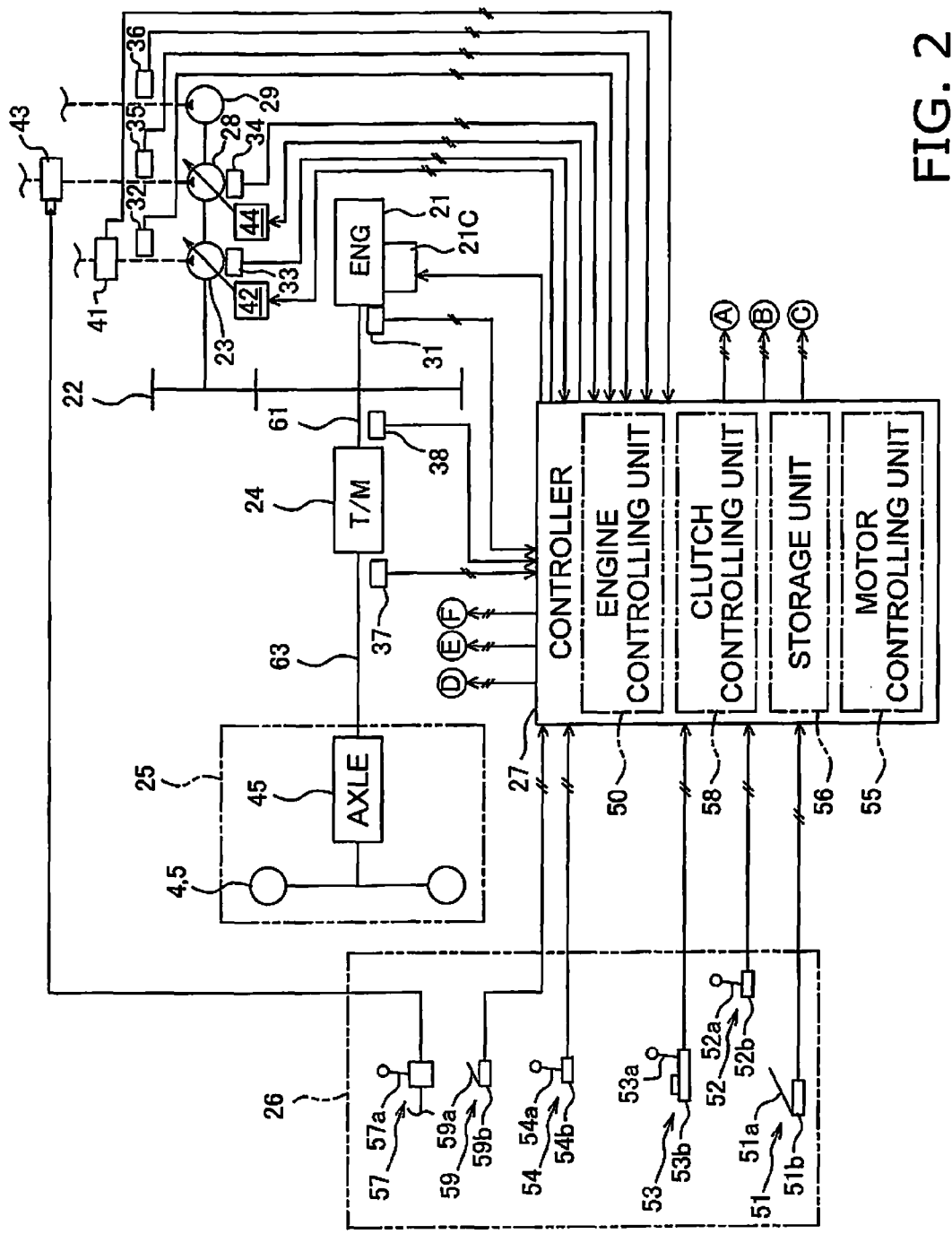
FIG. 2 is a schematic diagram showing a structure of the work vehicle.

FIG. 2 is a schematic diagram of a structure of the work vehicle 1. As shown in FIG. 2, the work vehicle 1 includes an engine 21, a power take off (PTO) 22, a power transmission 24, a travelling apparatus 25, an operating device 26, a controller 27 and so forth.

The engine 21 is, for instance, a diesel engine. The output of the engine 21 is controlled by regulating the amount of fuel to be injected into the cylinder of the engine 21. The controller 27 controls a fuel injection device 21C attached to the engine 21 to regulate amount of fuel. The work vehicle 1 includes an engine rotational speed detecting unit 31. The engine rotational speed detecting unit 31 is configured to detect an engine rotational speed and transmit a detection signal indicating the engine rotational speed to the controller 27.

The work vehicle 1 includes the work implement pump 23, the steering pump 28 and a transmission pump 29. The work implement pump 23, the steering pump 28 and the transmission pump 29 are hydraulic pumps. The MD 22 is configured to transmit part of a driving force from the engine 21 to these hydraulic pumps 23, 28 and 29. In other words, the PTO 22 is configured to distribute the driving force from the engine 21 to these hydraulic pumps 23, 28 and 29 and the power transmission 24.

The work implement pump 23 is driven by the driving force from the engine 21. The hydraulic oil discharged from the work implement pump 23 is supplied to the aforementioned lift cylinder 13 and bucket cylinder 14 through a work implement control valve 41. The work vehicle 1 includes a work implement pump pressure detecting unit 32. The work implement pump pressure detecting unit 32 is configured to detect the discharge pressure of the hydraulic oil from the work implement pump 23 (hereinafter referred to as "a work implement pump pressure") and transmit a detection signal indicating the work implement pump pressure to the controller 27.

The work implement pump 23 is a variable displacement hydraulic pump. The discharge volume of the work implement pump 23 is changed by changing the tilt angle of either a swashplate or a tilting shaft of the work implement pump 23. A first displacement control device 42 is connected to the work implement pump 23. The first displacement control device 42 is controlled by the controller 27 and is configured to change the tilt angle of the work implement pump 23. Accordingly, the discharge volume of the work implement pump 23 is controlled by the controller 27. For example, the first displacement control device 42 is configured to regulate the tilt angle of the work implement pump 23 such that a pressure differential between the both sides of the work implement control valve 41 can be constant. Additionally, the first displacement control device 42 is capable of arbitrarily changing the tilt angle of the work implement pump 23 in response to a command signal from the controller 27. When described in detail, the first displacement control device 42 includes a first valve and a second valve, both of which are not shown in the drawings. When the hydraulic oil to be supplied to the work implement 3 is changed by the aforementioned work implement control valve 41, a pressure differential is generated between the discharge pressure of the work implement pump 23 and the pressure on the outlet side of the work implement control valve 41 in accordance with change in opening degree of the work implement control valve 41. When controlled by the controller 27, the first valve is configured to regulate the tilt angle of the work implement pump 23 such that the pressure differential between the both sides of the work implement control valve 41 can be constant even when the load of the work implement 3 fluctuates. On the other hand, when controlled by the controller 27, the second valve is capable of further changing the tilt angle of the work implement pump 23. The work vehicle 1 includes a first tilt angle detecting unit 33. The first tilt angle detecting unit 33 is configured to detect the tilt angle of the work implement pump 23 and transmit a detection signal indicating the tilt angle to the controller 27.

The steering pump 28 is driven by the driving force form the engine 21. The hydraulic oil discharged from the steering pump 28 is supplied to the aforementioned steering cylinder 18 through a steering control valve 43. The work vehicle 1 includes a steering pump pressure detecting unit 35. The steering pump pressure detecting unit 35 is configured to detect the discharge pressure of the hydraulic oil from the steering pump 28 (hereinafter referred to as "a steering pump pressure") and transmit a detection signal indicating the steering pump pressure to the controller 27.

The steering pump 28 is a variable displacement hydraulic pump. The discharge volume of the steering pump 28 is changed by changing the tilt angle of either a swashplate or a tilting shaft of the steering pump 28. A second displacement control device 44 is connected to the steering pump 28. The second displacement control device 44 is controlled by the controller 27 and is configured to change the tilt angle of the steering pump 28. Accordingly, the discharge volume of the steering pump 28 is controlled by the controller 27. The work vehicle 1 includes a second tilt angle detecting unit 34. The second tilt angle detecting unit 34 is configured to detect the tilt angle of the steering pump 28 and transmit a detection signal indicating the tilt angle to the controller 27.

The transmission pump 29 is driven by the driving force from the engine 21. The transmission pump 29 is a fixed displacement hydraulic pump. The hydraulic oil discharged from the transmission pump 29 is supplied to clutches CF, CR, CL and CH of the power transmission 24 through clutch control valves VF, VR, VL and VH to be described. The work vehicle 1 may include a transmission pump pressure detecting unit 36. The transmission pump pressure detecting unit 36 is configured to detect the discharge pressure of the hydraulic oil from the transmission pump 29 (hereinafter referred to as "a transmission pump pressure") and transmit a detection signal indicating the transmission pump pressure to the controller 27.

The PTO 22 is configured to transmit part of the driving force form the engine 21 to the power transmission 24. The power transmission 24 is configured to transmit the driving force from the engine 21 to the travelling apparatus 25. The power transmission 24 is configured to change the speed of the driving force from the engine 21 and output the speed-changed driving force. The structure of the power transmission 24 will be explained below in detail.

The travelling apparatus 25 includes an axle 45 and the travelling wheels 4 and 5. The axle 45 is configured to transmit the driving force from the power transmission 24 to the travelling wheels 4 and 5. The travelling wheels 4 and 5 are thereby rotated. The work vehicle 1 includes an output rotational speed detecting unit 37 and an input rotational speed detecting unit 38. The output rotational speed detecting unit 37 is configured to detect the rotational speed of an output shaft 63 of the power transmission 24 (hereinafter referred to as "an output rotational speed"). The output rotational speed corresponds to the vehicle speed. Hence, the output rotational speed detecting unit 37 is configured to detect the vehicle speed by detecting the output rotational speed. The input rotational speed detecting unit 38 is configured to detect the rotational speed of an input shaft 61 of the power transmission 24 (hereinafter referred to as "an input rotational speed"). The output rotational speed detecting unit 37 is configured to transmit a detection signal indicating the output rotational speed to the controller 27. The input rotational speed detecting unit 38 is configured to transmit a detection signal indicating the input rotational speed to the controller 27.

It should be noted that instead of the output rotational speed detecting unit 37 and the input rotational speed detecting unit 38, another rotational speed detecting unit may be provided for detecting the rotational speed of a rotary component inside the power transmission 24 and transmitting the detected rotational speed to the controller 27, and the controller 27 may be configured to calculate the input rotational speed and the output rotational speed on the basis of the rotational speed of the rotary component.

The operating device 26 is operated by the operator. The operating device 26 includes an accelerator operating device 51, a work implement operating device 52, a gearshift operating device 53, a forward/rearward movement switch operating device 54, a steering operating device 57, and a brake operating device 59.

The accelerator operating device 51 includes an accelerator operating member 51a and an accelerator operation detecting unit 51b. The accelerator operating member 51a is operated for setting a target rotational speed of the engine 21. The accelerator operation detecting unit 51b is configured to detect the operating amount of the accelerator operating member 51a (hereinafter referred to as "an accelerator operating amount"). The accelerator operating amount means the pressed-down amount of the accelerator operating member 51a.

The work implement operating device 52 includes a work implement operating member 52a and a work implement operation detecting unit 52b. The work implement operating member 52a is operated for activating the work implement 3. The work implement operation detecting unit 52b is configured to detect the position of the work implement operating member 52a. For example, the work implement operation detecting unit 52b is configured to detect the position of the work implement operating member 52a by converting the tilt angle of the work implement operating member 52a into a corresponding electric signal.

The gearshift operating device 53 includes a gearshift operating member 53a and a gearshift operation detecting unit 53b. The operator is capable of selecting one of gear stages of the power transmission 24 by operating the gearshift operating member 53a. The gearshift operation detecting unit 53b is configured to detect a gear stage specified by the gearshift operating member 53a.

The forward/rearward movement switch operating device 54 includes a forward/rearward movement switch operating member 54a and a forward/rearward movement switch operation detecting unit 54b. The operator is capable of switching between forward movement and rearward movement of the work vehicle 1 by operating the forward/rearward movement switch operating member 54a. The forward/rearward movement switch operation detecting unit 54b is configured to detect the position of the forward/rearward movement switch operating member 54a.

The steering operating device 57 includes a steering operating member 57a. The steering operating device 57 is configured to drive the steering control valve 43 by supplying a pilot hydraulic pressure to the steering control valve 43 in response to an operation of the steering operating member 57a. The operator is capable of changing the moving direction of the work vehicle 1 right and left by operating the steering operating member 57a. It should be noted that the steering operating device 57 may be configured to drive the steering control valve 43 by converting the operation of the steering operating member 57a into an electric signal.

The brake operating device 59 includes a brake operating member 59a and a brake operation detecting unit 59b. The operator causes the work vehicle 1 to generate a braking force by activating a brake device (not shown in the drawing) by operating the brake operating member 59a. The brake operation detecting unit 59b is configured to detect the operating amount of the brake operating member 59a (hereinafter referred to as "a brake operating amount"). The brake operating amount means the pressed-down amount of the brake operating member 59a. The brake operation detecting unit 59b is configured to output a detection signal indicating the operating amount of the brake operating member 59a to the controller 27.

The controller 27 includes an arithmetic logic unit, such as a CPU, and memories, such as a RAM and a ROM, and is configured to perform a variety of processing for controlling the work vehicle 1. Additionally, the controller 27 includes a motor controlling unit 55 and a clutch controlling unit 58, which are units for controlling the power transmission 24, and a storage unit 56. The control of the power transmission 24 will be explained below in detail. The storage unit 56 stores a variety of programs and data for controlling the work vehicle 1.

The controller 27 includes an engine controlling unit 50 for controlling the engine 21. The engine controlling unit 50 is configured to transmit a command signal indicating a command throttle value (a throttle value command signal) to the fuel injection device 21C such that the target rotational speed of the engine 21 can be achieved in accordance with the accelerator operating amount. The controller 27 is configured to control the work implement control valve 41 on the basis of the detection signal from the work implement operation detecting unit 52b to control the hydraulic pressures to be supplied to the hydraulic cylinders 13 and 14. Accordingly, the hydraulic cylinders 13 and 14 are extended and contracted, and the work implement 3 is activated.

Figure 3:
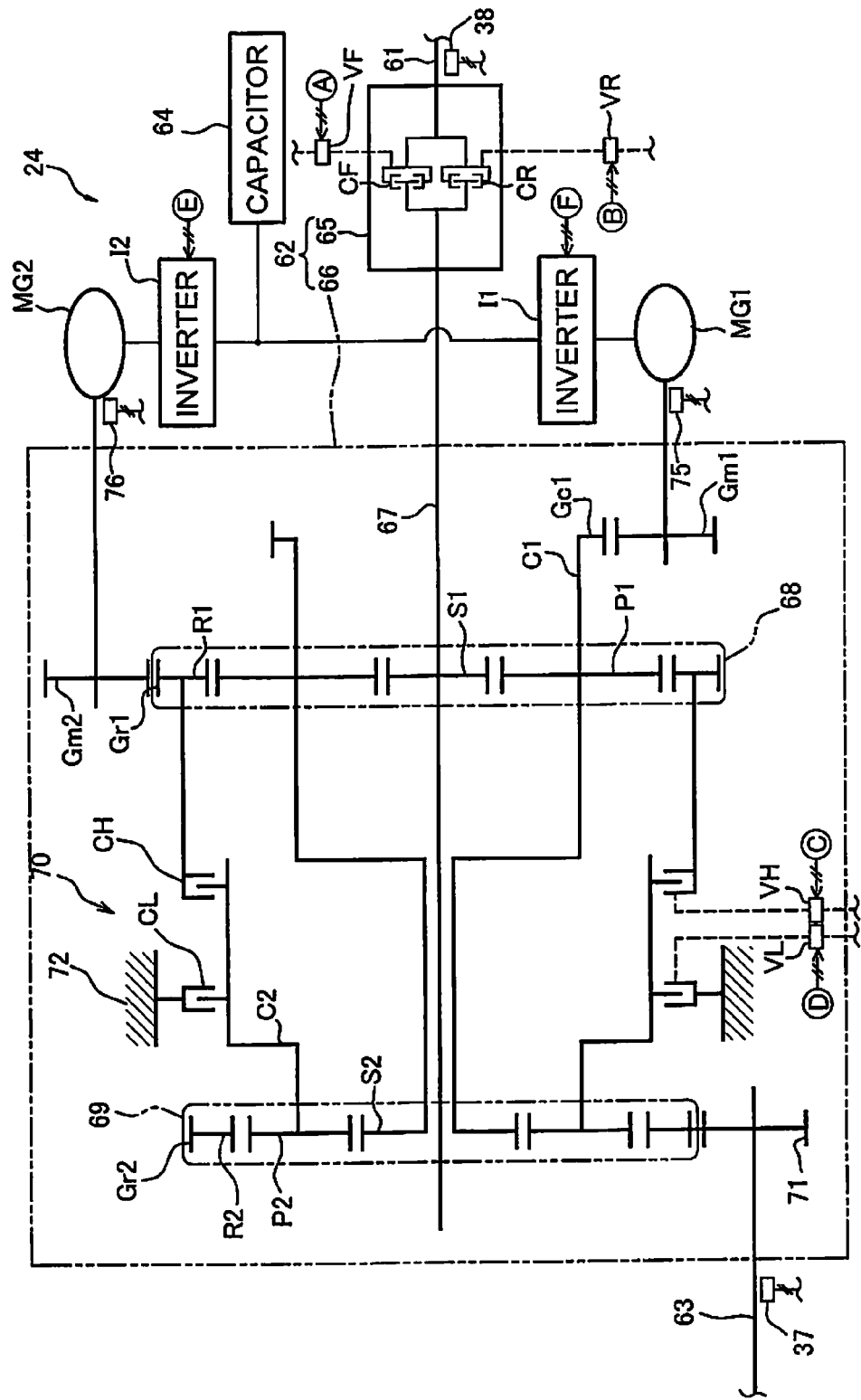
FIG. 3 is a schematic diagram showing a structure of a power transmission.

Next, the structure of the power transmission 24 will be explained in detail. FIG. 3 is a schematic diagram showing the structure of the power transmission 24. As shown in FIG. 3, the power transmission 24 includes the input shaft 61, a gear mechanism 62, the output shaft 63, a first motor MG1, a second motor MG2 and a capacitor 64. The input shaft 61 is connected to the aforementioned PTO 22. Rotation from the engine 21 is inputted into the input shaft 61 through the PTO 22. The gear mechanism 62 is configured to transmit the rotation of the input shaft 61 to the output shaft 63. The output shaft 63 is connected to the aforementioned travelling apparatus 25, and is configured to transmit the rotation from the gear mechanism 62 to the aforementioned travelling apparatus 25.

The gear mechanism 62 is a mechanism configured to transmit a driving force from the engine 21. The gear mechanism 62 causes speed ratio of the output shaft 63 to the input shaft 61 to vary in accordance with variation in rotational speed of the motors MG1 and MG2. The gear mechanism 62 includes a forward/rearward movement switch mechanism 65 and a gearshift mechanism 66.

The forward/rearward movement switch mechanism 65 includes the F clutch CF, the R clutch CR, and a variety of gears not shown in the drawings. The F clutch CF and the R clutch CR are hydraulic clutches, and the hydraulic oil is supplied to the respective clutches CF and CR from the transmission pump 29. The hydraulic oil to be supplied to the F clutch CF is controlled by the F clutch control valve VF. The hydraulic oil to be supplied to the R clutch CR is controlled by the R clutch control valve VR. The respective clutch control valves VF and VR are controlled by command signals from the clutch controlling unit 58. Engagement/disengagement of the F clutch CF and engagement/disengagement of the R clutch CR are switched, thereby the direction of the rotation to be outputted from the forward/rearward movement switch mechanism 65 is switched.

The gearshift mechanism 66 includes a transmission shaft 67, a first planetary gear mechanism 68, a second planetary gear mechanism 69, a Hi/Lo switch mechanism 70 and an output gear 71. The transmission shaft 67 is coupled to the forward/rearward movement switch mechanism 65.

The first planetary gear mechanism 68 includes a first sun gear S1, a plurality of first planet gears P1, a first carrier C1 supporting the plural first planet gears P1, and a first ring gear R1. The first sun gear S1 is coupled to the transmission shaft 67. The plural first planet gears P1 are meshed with the first sun gear S1 and are rotatably supported by the first carrier C1. A first carrier gear Gc1 is provided on the outer peripheral part of the first carrier C1. The first ring gear R1 is meshed with the plural first planet gears P1 and is also rotatable. Additionally, a first ring outer peripheral gear Gr1 is provided on the outer periphery of the first ring gear R1.

The second planetary gear mechanism 69 includes a second sun gear S2, a plurality of second planet gears P2, a second carrier C2 supporting the plural second planet gears P2, and a second ring gear R2. The second sun gear S2 is coupled to the first carrier C1. The plural second planet gears P2 are meshed with the second sun gear S2 and are rotatably supported by the second carrier C2. The second ring gear R2 is meshed with the plural planet gears P2 and is also rotatable. A second ring outer peripheral gear Gil is provided on the outer periphery of the second ring gear R2. The second ring outer peripheral gear Gr2 is meshed with the output gear 71, and the rotation of the second ring gear R2 is outputted to the output shaft 63 through the output gear 71.

The Hi/Lo switch mechanism 70 is a mechanism for selectively switching a driving force transmission path in the power transmission 24 between a first mode and a second mode. In the present exemplary embodiment, the first mode is a high speed mode (a Hi mode) in which the vehicle speed is high, whereas the second mode is a low speed mode (a Lo mode) in which the vehicle speed is low. The present Hi/Lo switch mechanism 70 includes the H clutch CH configured to be engaged in the Hi mode and the L clutch CL configured to be engaged in the Lo mode. The H clutch CH is configured to connect or disconnect the rust ring gear R1 and the second carrier C2. On the other hand, the L clutch CL is configured to connect or disconnect the second carrier C2 and a stationary end 72, and is thus configured to prevent or allow rotation of the second carrier C2.

It should be noted that the respective clutches CH and CL are hydraulic clutches, and the hydraulic oil is supplied to the respective clutches CH and CL separately from the transmission pump 29. The hydraulic oil to be supplied to the H clutch CH is controlled by the H clutch control valve VH. The hydraulic oil to be supplied to the L clutch CL is controlled by the L clutch control valve VL. The respective clutch control valves VH and VL are controlled by command signals from the clutch controlling unit 58.

The first motor MG1 and the second motor MG2 function as drive motors configured to generate a driving force by electric energy. Additionally, the first motor MG1 and the second motor MG2 also function as generators configured to generate electric energy with use of a driving force to be inputted thereto. The first motor MG1 is configured to function as the generator when a command signal is given thereto from the motor controlling unit 55 such that a torque acts on the first motor MG1 in the opposite direction to the rotational direction of the first motor MG1. A first motor gear Gm1 is fixed to the output shaft of the first motor MG1, and is meshed with the first carrier gear Gc1. In other words, the first motor MG1 is connected to a rotary element of the first planetary gear mechanism 68.

A first inverter I1 is connected to the first motor MG1, and a motor command signal for controlling the motor torque of the first motor MG1 is given to the first inverter I1 from the motor controlling unit 55. The rotational speed of the first motor MG1 is detected by a first motor rotational speed detecting unit 75. The first motor rotational speed detecting unit 75 is configured to transmit a detection signal indicating the rotational speed of the first motor MG1 to the controller 27.

The second motor MG2 is configured similarly to the first motor MG1. A second motor gear Gm2 is fixed to the output shaft of the second motor MG2, and is meshed with the first ring outer peripheral gear Gr1. In other words, the second motor MG2 is connected to a rotary element of the first planetary gear mechanism 68. Additionally, a second inverter I2 is connected to the second motor MG2, and a motor command signal for controlling the motor torque of the second motor MG2 is given to the second inverter I2 from the motor controlling unit 55. The rotational speed of the second motor MG2 is detected by a second motor rotational speed detecting unit 76. The second motor rotational speed detecting unit 76 is configured to transmit a detection signal indicating the rotational speed of the second motor MG2 to the controller 27.

The capacitor 64 functions as an energy storage for storing energy to be generated by the motors MG1 and MG2. In other words, the capacitor 64 is configured to store electric power generated by each motor MG1, MG2 when each motor MG1, MG2 functions as a generator. It should be noted that a battery, functioning as another electric storage means, may be used instead of the capacitor. It should be noted that the capacitor 64 may not be provided when the motors MG1 and MG2 can be respectively driven such that one of the motors MG1 and MG2 generates electric power and the other is electrified by the electric power.

The motor controlling unit 55 is configured to receive detection signals from a variety of detecting units and give command signals, which indicate command torques of the motors MG1 and MG2, to the respective inverters I1 and I2. On the other hand, the clutch controlling unit 58 is configured to give command signals for controlling the clutch hydraulic pressures of the respective clutches CF, CR, CH and CL to the respective clutch control valves VF, VR, VH and VL. Accordingly, the gear ratio and the output torque of the power transmission 24 are controlled. The action of the power transmission 24 will be hereinafter explained.

Figure 4:
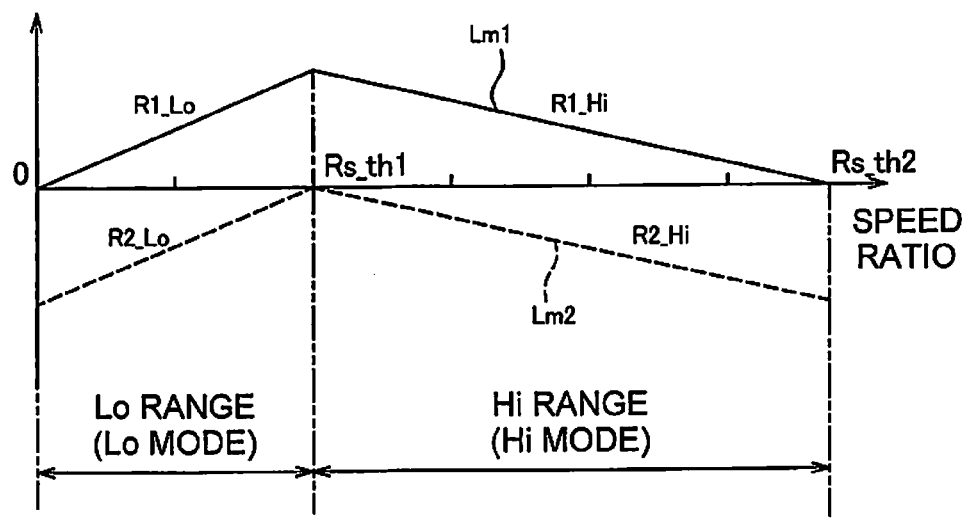
FIG. 4 is a diagram showing variation in rotational speed of a first motor and variation in rotational speed of a second motor with respect to a speed ratio of the power transmission.

Next, with FIG. 4, explanation will be provided for the schematic action performed by the power transmission 24 when the vehicle speed accelerates from 0 in a forward movement direction while the rotational speed of the engine 21 is kept constant. FIG. 4 is a diagram showing a rotational speed ratio of each motor MG1, MG2 with respect to a speed ratio of the power transmission 24. The speed ratio is an absolute value of a ratio of the rotational speed of the output shaft 63 to the rotational speed of the input shaft 61. The rotational speed ratio of the motor MG1 is a ratio of the rotational speed of the output shaft of the motor MG1 to the rotational speed of the input shaft 61. The rotational speed ratio of the motor MG2 is a ratio of the rotational speed of the output shaft of the motor MG2 to the rotational speed of the input shaft 61. When the rotational speed of the engine 21 is constant, the vehicle speed varies in accordance with the speed ratio of the power transmission 24. Therefore, in FIG. 4, variation in speed ratio of the power transmission 24 corresponds to variation in vehicle speed. In other words, FIG. 4 shows a relation between the rotational speed of each motor MG1, MG2 and the vehicle speed. In FIG. 4, a solid line Lm1 indicates the rotational speed of the first motor MG1, whereas a broken line Lm2 indicates the rotational speed of the second motor MG2.

In a Lo range (the Lo mode) that the speed ratio is greater than or equal to 0 and less than or equal to a first threshold Rs_th1, the L clutch CL is configured to be engaged whereas the H clutch CH is configured to be disengaged. The first threshold Rs_th1 is a mode switching threshold for determining mode switching. In the Lo range, the H clutch CH is configured to be disengaged, and hence, the second carrier C2 and the first ring gear R1 are configured to be disconnected. On the other hand, the L clutch CL is configured to be engaged, and hence, the second carrier C2 is configured to be fixed.

In the Lo range, the driving force from the engine 21 is inputted into the first sun gear S1 through the transmission shaft 67, and is outputted to the second sun gear S2 from the first carrier C1. On the other hand, the driving force inputted into the first sun gear S1 is transmitted to the first ring gear R1 from the first planet gears P1, and is outputted to the second motor MG2 through the first ring outer peripheral gear Gr1 and the second motor gear Gm2. During power running of the work vehicle 1, the second motor MG2 functions as a generator in the Lo range, and part of electric power generated by the second motor MG2 may be supplied to the first motor MG1. Alternatively, part of electric power generated by the second motor MG2 may be stored in the capacitor 64.

On the other hand, during power running of the work vehicle 1, in the Lo range, the first motor MG1 functions as an electric motor configured to be driven by electric power supplied from either the second motor MG2 or the capacitor 64. The driving force of the first motor MG1 is outputted to the second sun gear S2 through a path of the first motor gear Gm1, the first carrier gear Gc1, and then the first carrier C1. The driving force, outputted to the second sun gear S2 as described above, is transmitted to the output shaft 63 through a path of the second planet gears P2, the second ring gear R2, the second ring outer peripheral gear Gr2, and then the output gear 71.

Additionally, the rotational speed of the second motor MG2 becomes "0" when the speed ratio is the first threshold Rs_th1. In other words, the second motor MG2 is deactivated.

In a Hi range (the Hi mode) that the speed ratio is greater than or equal to the first threshold Rs_th1, the H clutch CH is configured to be engaged whereas the L clutch CL is configured to be disengaged. In the Hi range, the H clutch CH is configured to be engaged, and hence, the second carrier C2 and the first ring gear R1 are configured to be connected. On the other hand, the L clutch CL is configured to be disengaged, and hence, the second carrier C2 is released. Therefore, the rotational speed of the first ring gear R1 and that of the second carrier C2 becomes equal.

In the Hi range, the driving force from the engine 21 is inputted into the first sun gear S1, and is outputted to the second sun gear S2 from the first carrier C1. On the other hand, the driving force inputted into the first sun gear S1 is outputted to the first motor MG1 from the first carrier C1 through the first carrier gear Gc1 and the first motor gear Gm1. During power running of the work vehicle 1, the first motor MG1 functions as a generator in the Hi range, and hence, part of electric power generated by the first motor MG1 may be supplied to the second motor MG2. Alternatively, part of electric power generated by the first motor MG1 may be stored in the capacitor 64.

Additionally, during power running of the work vehicle 1, the second motor MG2 functions as an electric motor configured to be driven by electric power supplied from either the first motor MG1 or the capacitor 64 as needed. The driving force of the second motor MG2 is outputted to the second carrier C2 through a path of the second motor gear Gm2, the first ring outer peripheral gear Gr1, the first ring gear R1, and then the H clutch CH. The driving force, outputted to the second sun gear S2 as described above, is outputted to the second ring gear R2 through the second planet gears P2, while the driving force outputted to the second carrier C2 is outputted to the second ring gear R2 through the second planet gears P2. A net driving force, resulting from composition of the driving forces in the second ring gear R2 as described above, is transmitted to the output shaft 63 through the second ring outer peripheral gear Gr2 and the output gear 71.

Then, when the speed ratio is a second threshold Rs_th2, the rotational speed of the first motor MG1 becomes "0", and in other words, the first motor MG1 stops rotating. It should be noted that during braking of the work vehicle 1, the role of the first motor MG1 and that of the second motor MG2 are reversed. The aforementioned explanation relates to a situation of forward movement. However, a similar action is performed even in a situation of rearward movement Additionally, the first threshold Rs_th1 and the second threshold Rs_th2 are stored in the storage unit 56.

Next, the schematic action of the power transmission 24 will be explained with nomograms. The rotational speed and the number of teeth of the first sun gear S1 in the first planetary gear mechanism 68 are respectively set as Ns1 and Zs1. The rotational speed of the first carrier C1 is set as Nc1. The rotational speed and the number of teeth of the first ring gear R1 are respectively set as Nr1 and Zr1. On the other hand, the rotational speed and the number of teeth of the second sun gear S2 in the second planetary gear mechanism 69 are respectively set as Ns2 and Zs2. The rotational speed of the second carrier C2 is set as Nc2. The rotational speed and the number of teeth of the second ring gear R2 are respectively set as Nr2 and Zr2. With the settings, nomograms shown in FIGS. 5A-5C are obtained by representing a relation between the rotational speed and the number of teeth of each element in the first planetary gear mechanism 68 and those of each element in the second planetary gear mechanism 69.

In the nomograms, relations among the rotational speeds of the respective elements in the respective planetary gear mechanisms are depicted with straight lines. Therefore, as shown in FIGS. 5A-5C, Ns1, Nc1 and Nr1 are aligned on a straight line. Likewise, Ns2, Nc2 and Nr2 are also aligned on a straight line. It should be noted that in FIGS. 5A-5C, a solid line Lp1 indicates relations among the rotational speeds of the respective elements in the first planetary gear mechanism 68. A broken line Lp2 indicates relations among the rotational speeds of the respective elements in the second planetary gear mechanism 69.

Figure 5A:
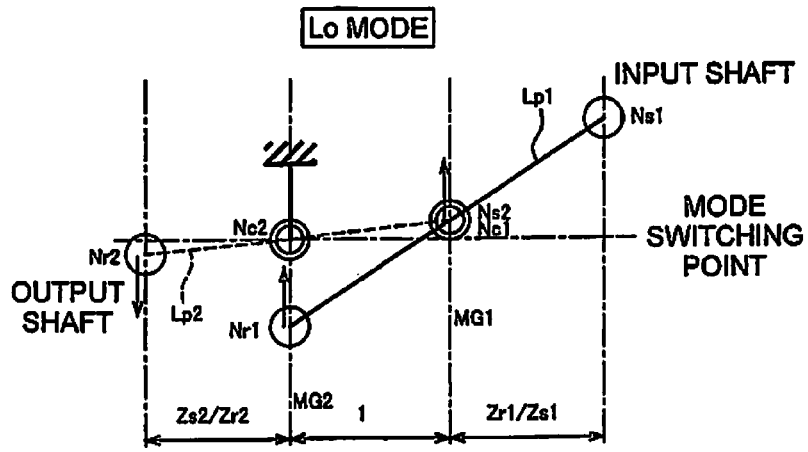
FIGS. 5A-5C include nomograms showing relations among the rotational speeds and the numbers of teeth of respective elements in a first planetary gear mechanism and those of respective elements in a second planetary gear mechanism.

FIG. 5A shows rotational speeds of the respective elements in the Lo mode. As described above, when the rotational speed of the engine 21 is set constant for easy explanation, Ns1 is set as constant. When the engine rotational direction is herein set as positive, the rotational speed Ns1 is set as positive. In a mode switching point to be described, the rotational speed of the second motor MG2 is 0. Hence, when a given rotary element is plotted on the mode switching point depicted with a dashed dotted line in the drawing, the rotational speed of the rotary element is 0. When a given rotary element is plotted in a range below the dashed dotted line of the mode switching point, the rotational speed of the rotary element is negative. In the Lo mode, increase in rotational speed of the first motor MG1 results in increase in Nc1. When Nc1 increases, Nr1 increases. Accordingly, the rotational speed of the second motor MG2 increases. Additionally, in the power transmission 24, the first carrier C1 is connected with the second sun gear S2. Therefore, Nc1 and Ns2 are equal. Thus, Ns2 also increases with increase in Nc1. In the Lo mode, the second carrier C2 is configured to be fixed to the stationary end 72. Hence, Nc2 is kept at 0. Therefore, increase in Ns2 results in decrease in Nr2. Accordingly, the speed ratio of the power transmission 24 increases. Thus, in the Lo mode, as rotational speed of the first motor MG1 increases, the speed ratio of the power transmission 24 increases.

Figure 5B:
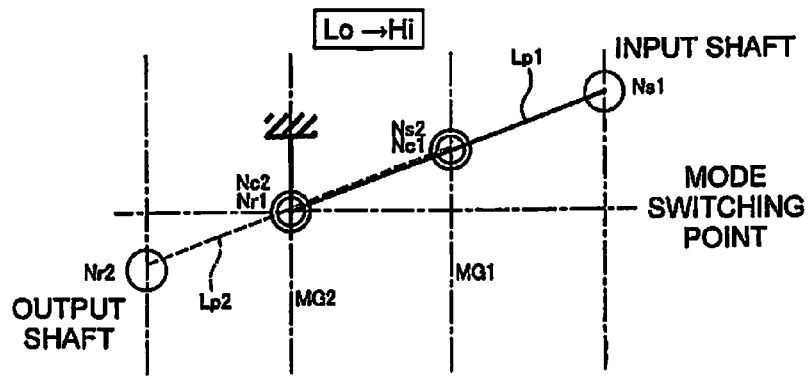
Figure 5C:
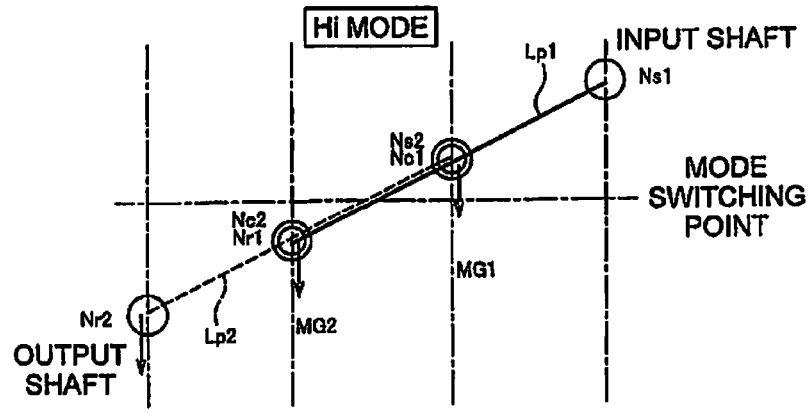

As shown in FIG. 5B, when the speed ratio of the power transmission 24 reaches the aforementioned first threshold Rs_th1, Nr1 becomes 0. Therefore, the rotational speed of the second motor MG2 becomes 0. At this time, mode switching is performed from the Lo mode to the Hi mode. In other words, the L clutch CL is configured to be switched from the engaged state to the disengaged state. Accordingly, the second carrier C2 is configured to be released from the stationary end 72 and becomes rotatable. On the other hand, the H clutch CH is configured to be switched from the disengaged state to the engaged state. Accordingly, the first ring gear R1 and the second carrier C2 are configured to be connected.

FIG. 5C shows the rotational speeds of the respective elements in the Hi mode. In the Hi mode, the first ring gear R1 and the second carrier C2 are connected, and hence, Nr1 and Nc2 are equal. Additionally, as described above, the first carrier C1 is coupled to the second sun gear S2, and hence, Nc1 and Ns2 are equal. Therefore, decrease in rotational speed of the second motor MG2 results in decrease in Nr1 and Nc2. Additionally, decrease in Nc2 results in decrease in Nr2. Accordingly, the speed ratio of the power transmission 24 increases. Thus, as rotational speed of the second motor MG2 increases, the speed ratio of the power transmission 24 increases. On the other hand, decrease in Nr1 and Nc2 results in decrease in Ns2 and Nc1. Accordingly, the rotational speed of the first motor MG1 decreases. Then, when the speed ratio of the power transmission 24 reaches the aforementioned second threshold Rs_th2, Ns2 and Nc1 become 0. Accordingly, the rotational speed of the first motor MG1 becomes 0. It should be noted that the aforementioned action is an action performed in switching from the Lo mode to the Hi mode, and an action in switching from the Hi mode to the Lo mode is performed in a reverse procedure from the aforementioned action.

As described above, when the rotational speed of the engine 21 is set constant, in other words, when the rotational speed of the input shaft 61 is set constant, in the Lo mode, the rotational speed of the first motor MG1 increases in accordance with increase in speed ratio. By contrast, in the Hi mode, the rotational speed of the first motor MG1 decreases in accordance with increase in speed ratio. Therefore, as shown in FIG. 4, in the Lo mode, the speed ratio varies at a rate of change R1_Lo with respect to the rotational speed ratio of the first motor MG1. However, in the Hi mode shown in FIG. 4, the speed ratio varies at a rate of change R1_Hi, which is different from the rate of change R1_Lo in the Lo mode, with respect to the rotational speed ratio of the first motor MG1. When described in detail, the positive/negative sign for the rate of change R1_Hi in the Hi mode and that for the rate of change R1_Lo in the Lo mode are different from each other. Additionally, when the speed ratio is the first threshold Rs_th1, the rotational speed ratio of the first motor MG1 in the Lo mode and that of the first motor MG1 in the Hi mode become equal.

On the other hand, when the rotational speed of the engine 21 is set constant, in other words, when the rotational speed of the input shaft 61 is set constant, in the Lo mode, the rotational speed of the second motor MG2 increases in accordance with increase in speed ratio. In the Hi mode, the rotational speed of the second motor MG2 decreases in accordance with increase in speed ratio. Therefore, as shown in FIG. 4, in the Lo mode, the speed ratio varies at a rate of change R2_Lo with respect to the rotational speed ratio of the second motor MG2. However, in the Hi mode shown in FIG. 4, the speed ratio varies at a rate of change R2_Hi, which is different from the rate of change R2_Lo in the Lo mode, with respect to the rotational speed ratio of the second motor MG2. When described in detail, the positive/negative sign for the rate of change R2_Hi in the Hi mode and that for the rate of change R2_Lo in the Lo mode are different from each other. Additionally, when the speed ratio is the first threshold $Rs_{13}$ th1, the rotational speed ratio of the second motor MG2 in the Lo mode and that of the second motor MG2 in the Hi mode become equal.

As described above, the clutch controlling unit 58 is configured to perform switching between the Lo mode and the Hi mode. The clutch controlling unit 58 is configured to switch the H clutch CH and the L clutch CL by transmitting clutch command signals to the H clutch control valve VH and the L clutch control valve VL. A control of switching between the Hi mode and the Lo mode will be hereinafter explained in detail.

Figure 6:
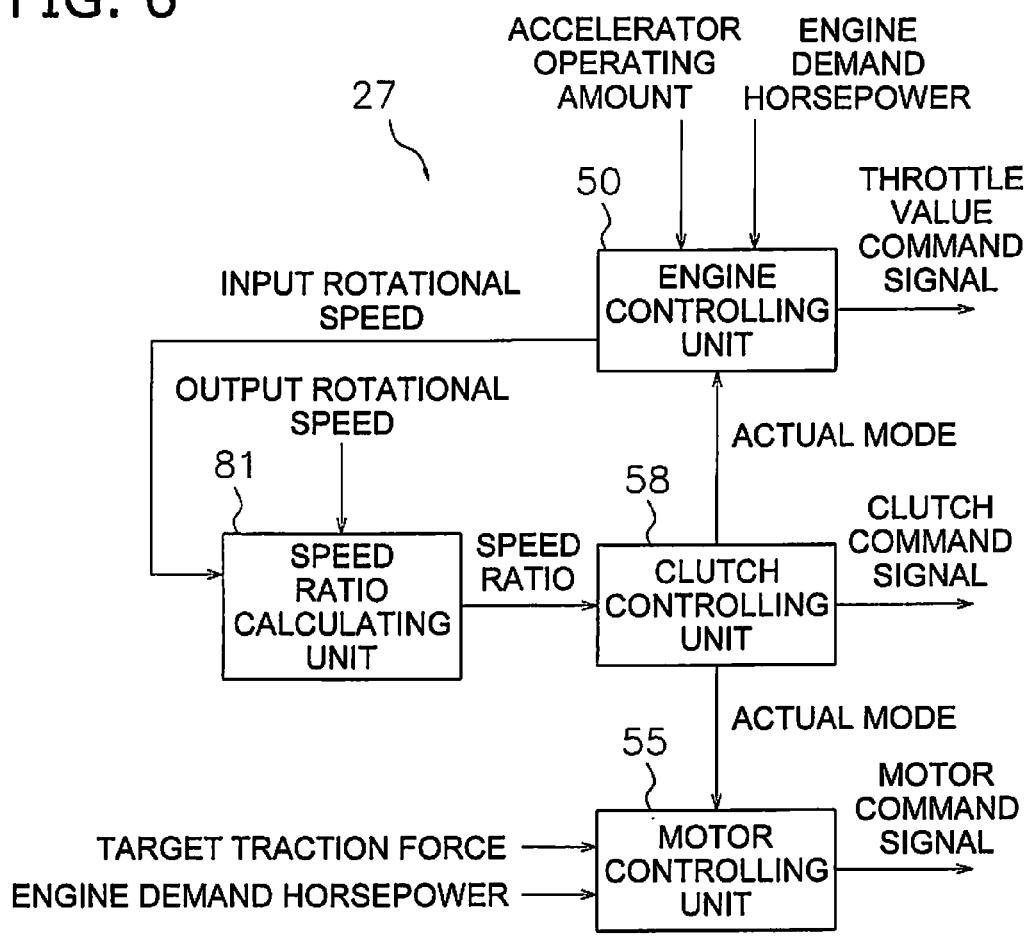
FIG. 6 is a block diagram showing a detailed internal structure of a controller according to a first exemplary embodiment.

FIG. 6 is a block diagram showing a detailed internal structure of the controller 27 according to a first exemplary embodiment. In FIG. 6, the storage unit 56 is not shown. As shown in FIG. 6, the controller 27 further includes a speed ratio calculating unit 81.

The speed ratio calculating unit 81 is configured to calculate the speed ratio of the power transmission 24 on the basis of the input rotational speed and the output rotational speed of the power transmission 24. The input rotational speed is detected by the input rotational speed detecting unit 38. The output rotational speed is detected by the output rotational speed detecting unit 37.

The clutch controlling unit 58 is configured to determine which of the Lo mode and the Hi mode should be selected on the basis of which of the following the speed ratio falls into: a range of greater than or equal to the first threshold Rs_th1 and a range of less than or equal to the first threshold Rs_th1, and is configured to transmit the clutch command signal for engaging the clutch (the H clutch CH, the L clutch CL) corresponding to the determined mode to the control valve (the H clutch control valve VH, the L clutch control valve VL) of the clutch corresponding to the determined mode. Specifically, when the speed ratio exists in the range of lower than or equal to the first threshold Rs_th1, the clutch controlling unit 58 is configured to determine that the Lo mode should be selected, and is configured to transmit the clutch command signal for disengaging the H clutch CH to the H clutch control valve VH and transmit the command signal for engaging the L clutch CL to the L clutch control valve VL. Then, when the speed ratio exists in the range of greater than or equal to the first threshold Rs_th1, the clutch controlling unit 58 is configured to determine that the Hi mode should be selected, and is configured to transmit the clutch command signal for disengaging the L clutch CL to the L clutch control valve VL and transmit the clutch command signal for engaging the H clutch CH to the H clutch control valve VH.

After transmitting the clutch control signal to the clutch control valve, the clutch controlling unit 58 may be configured to transmit a signal indicating an actual mode as a currently selected mode to the engine controlling unit 50 and the motor controlling unit 55. The motor controlling unit 55 and the engine controlling unit 50 may be configured to monitor the status of the L clutch CL or the H clutch CH and autonomously determine the actual mode.

After mode switching is performed, the engine controlling unit 50 is configured to output the throttle value command signal for changing the rotational speed of the engine 21 (i.e., the input rotational speed of the power transmission 24) to the fuel injection device 21C on the basis of the accelerator operating amount, an engine demand horsepower based on the operating amount of the work implement operating member 52a and the vehicle speed, and the actual mode obtained from the signal transmitted from the clutch controlling unit 58 and so forth.

The motor controlling unit 55 is configured to control the torque of the motor MG1, MG2 on the basis of the actual mode obtained from the signal transmitted from the clutch controlling unit 58 and so forth, the aforementioned engine demand horsepower, and a target traction force determined based on the vehicle speed and the accelerator operating amount, such that the target traction force can be obtained before and after the engine controlling unit 55 changes the rotational speed. More specifically, the motor controlling unit 55 is configured to calculate a standard idling rotational speed of the engine at present from the engine demand horsepower. The standard idling rotational speed is obtained from a standard regulation line that passes through a matching point that is an intersection between the engine demand horsepower and a preliminarily set matching line. Additionally, the motor controlling unit 55 is configured to determine a regulation line based on the actual mode, and set an intersection between the determined regulation line and an equal horsepower curve determined based on the engine demand horsepower as a new matching point in the actual mode. Then, the motor controlling unit 55 is configured to calculate the input torque of the power transmission 24 (the output torque of the engine 21) on the basis of the new matching point. Finally, the motor controlling unit 55 is configured to determine the torque of the motor MG1, MG2 with reference to torque balance information that defines a relation between the input torque and the target traction force and is calculated to satisfy torque balance in the power transmission 24. The vehicle speed is constant when the target traction force and resistance on the road surface are balanced, and the output rotational speed is kept unchanged even when mode switching is performed by the motor controlling unit 55. In such a case, when the input rotational speed is changed by the engine controlling unit 50, the speed ratio is changed to deviate from the mode switching threshold Rs_th1.

Figure 7:
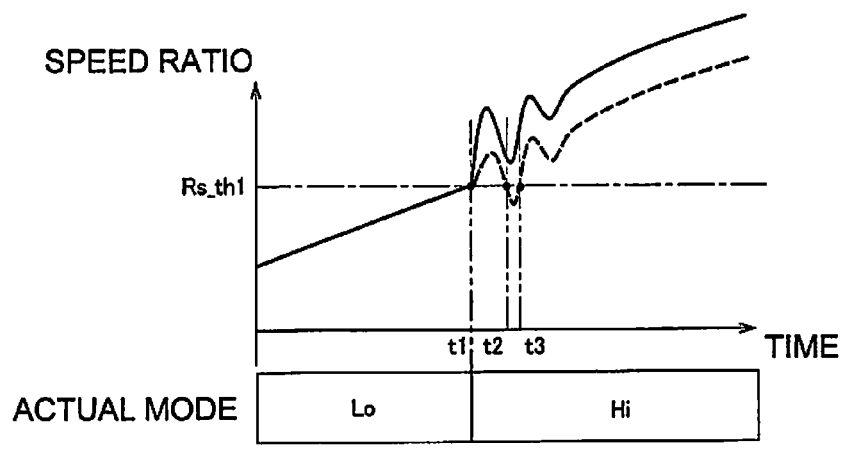
FIG. 7 is a chart showing an example of time-series variation in speed ratio and mode of the work vehicle according to the first exemplary embodiment.

Next, detailed actions of the engine controlling unit 50 and the motor controlling unit 55 in mode switching will be explained in detail with reference to drawings. FIG. 7 is a chart showing an example of time-series variation in speed ratio and mode of the work vehicle 1 according to the first exemplary embodiment. FIG. 7 shows time-series variation in speed ratio and mode when the work vehicle 1 travels under the same condition as FIG. 15. Now, FIG. 7 depicts transition of the speed ratio in FIG. 15 with a dashed line for easy comparison with the action in FIG. 15.

In FIG. 7, at time t1, the speed ratio has increased to the first threshold Rs_th1. Accordingly, at time t1, the clutch controlling unit 58 switches the power transmission 24 from the Lo mode to the Hi mode. In other words, at time t1, the clutch controlling unit 58 transmits the clutch command signal for disengaging the L clutch CL to the L clutch control valve VL and transmits the clutch command signal for engaging the H clutch CH to the H clutch control valve VH. At this time, the engine controlling unit 50 decreases the rotational speed of the engine 21 and increases the torque of the engine 21.

Figure 8:
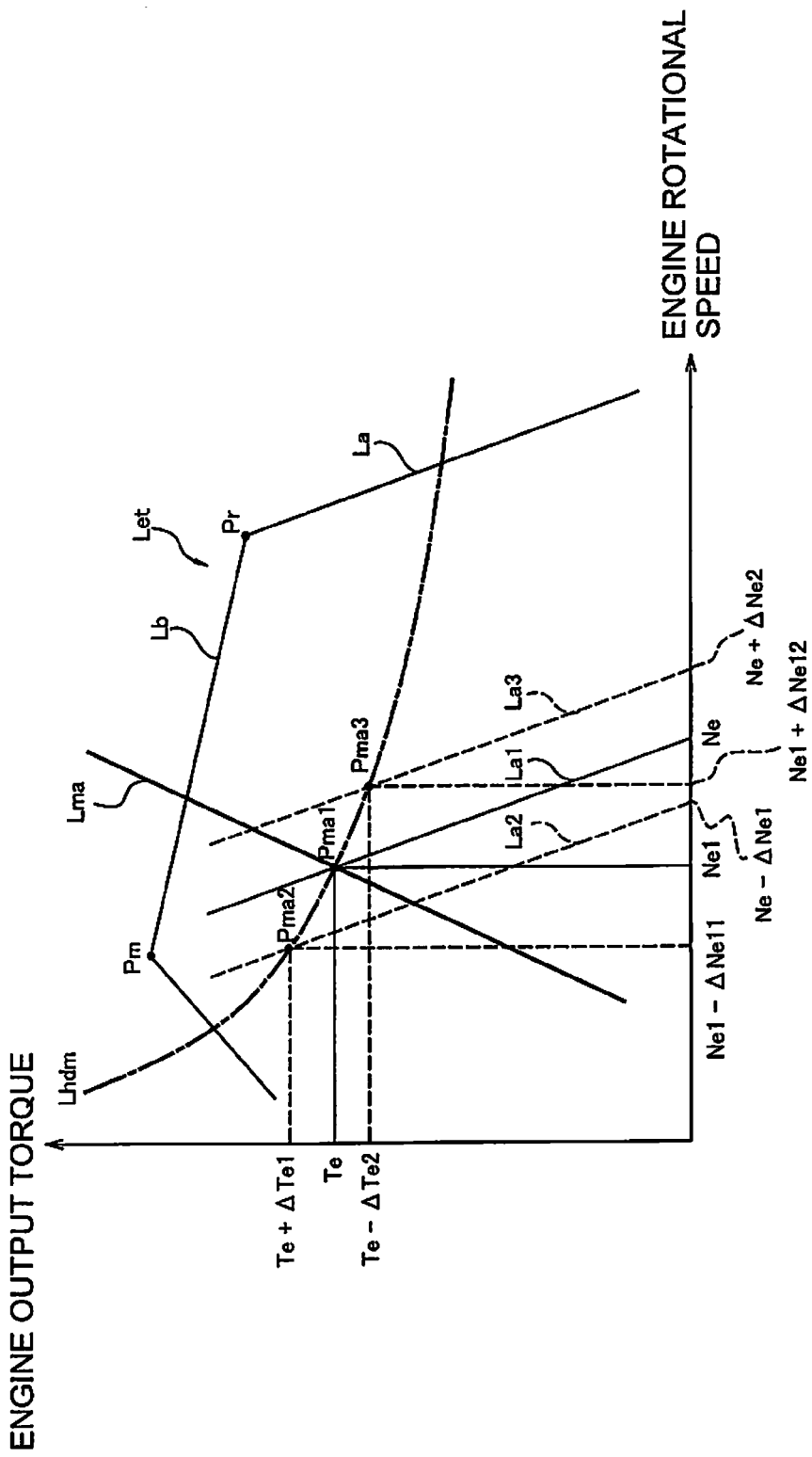
FIG. 8 is a diagram for explaining a method of changing an engine rotational speed and an engine torque by an engine controlling unit.

FIG. 8 is a diagram for explaining a method that the engine controlling unit 50 herein changes the rotational speed and the torque of the engine 21. In FIG. 8, an engine torque line Let defines a relation between the output torque of the engine 21 and the rotational speed of the engine 21. The engine torque line Let includes a regulation line La and a maximum torque line Lb. The regulation line La varies in accordance with the command throttle value (see La1, La2, and so forth in FIG. 8). The maximum torque line Lb includes a rated point Pr and a maximum torque point Pm plotted on the lower engine rotational speed side of the rated point Pr.

A matching line Lma is information for determining the output torque and the rotational speed of the engine 21. A matching line can be arbitrarily set, but in the present exemplary embodiment, the matching line Lma is utilized for obtaining a matching point when changing of the engine rotational speed in the present exemplary embodiment is not performed. In the present exemplary embodiment, the engine rotational speed is not changed in the Lo mode. Hence, the matching line Lma is utilized for obtaining a matching point Pma1 in the Lo mode. The engine torque line Let and the matching line Lma are preliminarily set and stored in the storage unit 56.

The Lo mode is maintained until time t1, and hence, an intersection between the matching line Lma and an equal horsepower curve Lhdm of the engine demand horsepower (a horsepower determined by the output demand horsepower of the power transmission 24, the output demand horsepower of the work implement 3, and so forth) inputted into the engine controlling unit 50 is obtained as the first matching point Pma1. The regulation line La1, passing through the first matching point Pma1, is uniquely determined. The regulation line La1 is referred to as the standard regulation line. In the present exemplary embodiment, the standard regulation line La1 is utilized in the Lo mode. Additionally, an idling engine rotational speed Ne is determined by the standard regulation line La1, and the throttle value of the engine 21 is determined based on the idling engine rotational speed Ne. In the Lo mode, the engine controlling unit 50 performs a control of making the output horsepower of the engine 21 transition on the regulation line La1. On the other hand, the motor controlling unit 55 controls the torque of the motor MG1, MG2 on the basis of the target traction force and an engine output torque Te that is obtained as the vertical-axis magnitude in the fast matching point Pma1 plotted as an intersection between the equal horsepower curve Lhdm and the regulation line La1. Therefore, the power transmission 24 consequently applies the torque Te to the input shaft 61. As a result, the matching point of the engine 21 settles at the first matching point Pma1. At this time, the rotational speed of the input shaft 61 in the first matching point Pma1 is Ne1.

At time t1, in response to switching from the Lo mode to the Hi mode, the engine controlling unit 50 decreases the throttle value of the engine 21 determined as described above by a small amount. As a result, the idling engine rotational speed Ne is changed into Ne−ΔNe1. The engine controlling unit 50 performs a control of making the output torque of the engine 21 transition on the regulation line La2 determined by the throttle value of the engine 21 corresponding to the idling engine rotational speed (Ne−ΔNe1). Next, the motor controlling unit 55 determines a torque value (Te+ΔTe1) such that the engine demand horsepower (the horsepower outputted by the engine) is kept unchanged before and after changing of the engine rotational speed (the rotational speed of the input shaft 61) even when mode switching is performed. In this case, the following (Equation 1) is established by utilizing a rotational speed Ne1 of the input shaft 61 in the first matching point Pma1 and the torque Te in the first matching point.

$$(Ne1-\Delta Ne11) \times (Te+\Delta Te1) = Ne1 \times Te \quad \text{(Equation 1)}$$

In (Equation 1), (Ne1−ΔNe11) indicates the rotational speed of the input shaft 61 in a second matching point Pma2 on the regulation line La2. A point (Ne1−ΔNe11, Te+ΔTe1) is plotted on the regulation line La2, and therefore, the motor controlling unit 55 is capable of calculating a torque (Te+ΔTe1) in the second matching point Pma2. When the torque value (Te+ΔTe1) in the second matching point Pma2 is determined, the motor controlling unit 55 controls the torque of the motor MG1, MG2 on the basis of the output torque (Te+ΔTe1) of the engine 21 such that the target traction force can be obtained before and after changing of the speed ratio. Accordingly, the output horsepower of the engine 21 transitions on the equal horsepower curve. Additionally, the power transmission 24 consequently applies the torque (Te+ΔTe1) to the input shaft 61, and the matching point of the engine 21 settles at the second matching point Pma2. Therefore, at time t1, the engine controlling unit 50 is capable of applying a negative valued offset (−ΔNe11) to the rotational speed Ne1 of the engine 21 (the rotational speed of the input shaft 61). At this time, switching into the Hi mode has been determined by the clutch controlling unit 58, and hence, the speed ratio exists in the range of greater than or equal to the first threshold Rs_th1. Moreover, the engine controlling unit 50 is capable of increasing the output torque of the engine 21 from Te to Te+ΔTe1.

Figure 15:
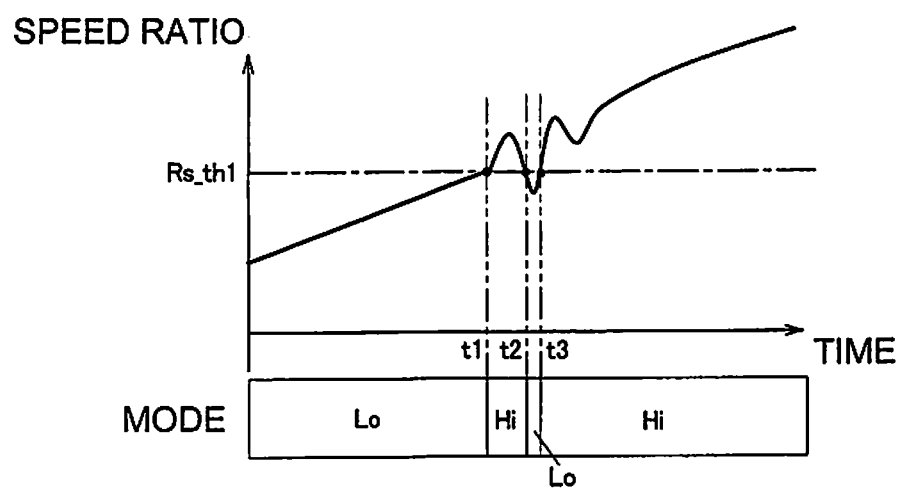
FIG. 15 is a diagram showing variation in mode of a power transmission path in a conventional art.

As a result of the aforementioned action, the speed ratio has a positive offset at or after time t1. In other words, in the Hi mode set by mode switching, the speed ratio is deviated from the mode switching threshold Rs_th1. Consequently, even when slightly fluctuating at or after time t1 as shown in FIG. 7, the speed ratio is unlikely to get lower than the first threshold Rs_th1. As a result, hunting is prevented that is caused as shown in FIG. 15 by switching the transmission path into the Hi mode and then immediately switching the transmission path from the Hi mode to the Lo mode.

Figure 9:
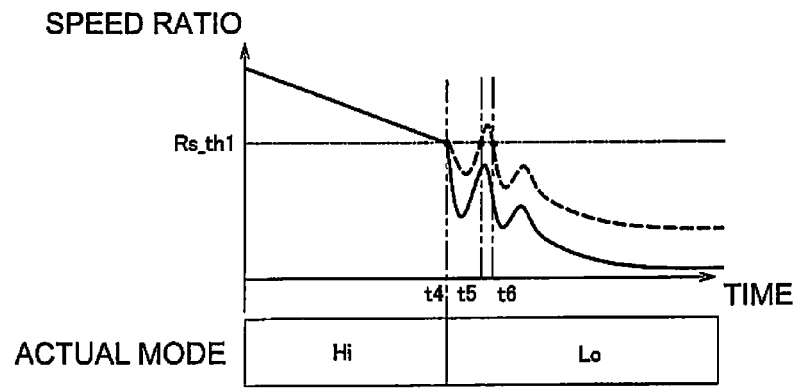
FIG. 9 is a chart showing an example of time-series variation in speed ratio and mode of the work vehicle according to the first exemplary embodiment.

Next, an action of the engine controlling unit 50 in switching from the Hi mode to the Lo mode will be explained in detail. FIG. 9 is a chart showing an example of time-series variation in speed ratio and mode of the work vehicle 1 in switching from the Hi mode to the Lo mode. The Hi mode is maintained until time t1, and hence, according to the aforementioned method, the rotational speed of the engine 21 (the rotational speed of the input shaft 61) is set as Ne1−ΔNe11 and the output torque of the engine 21 is set as Te+ΔTe1.

At time t4, the speed ratio has decreased to the first threshold Rs_th1. Accordingly, at time t4, the clutch controlling unit 58 switches the power transmission 24 from the Hi mode to the Lo mode. In other words, at time t4, the clutch controlling unit 58 transmits the clutch command signal for disengaging the H clutch CH to the H clutch control valve VH and transmits the clutch command signal for engaging the L clutch CL to the L clutch control valve VL. At this time, the engine controlling unit 50 applies an offset (+ΔNe11) to the rotational speed of the engine 21.

Specifically, in accordance with switching from the Hi mode to the Lo mode, the engine controlling unit 50 increases the throttle value of the engine 21 such that the idling engine rotational speed is changed from Ne−ΔNe1 to Ne (see FIG. 8). The engine controlling unit 50 performs a control of making the output torque of the engine 21 transition on the regulation line La1 determined by the throttle value of the engine 21 corresponding to the idling engine rotational speed (Ne). Next, the motor controlling unit 55 determines the torque value Te on the basis of (Math. 1) and a constraint condition of the regulation line La1 such that the engine demand horsepower is kept unchanged before and after changing of the engine rotational speed (the rotational speed of the input shaft 61) even when mode switching is performed. When the torque Te in the first matching point Pma1 is calculated, the motor controlling unit 55 controls the torque of the motor MG1, MG2 on the basis of the output torque Te of the engine 21 obtained from the engine controlling unit 50 such that the target traction force can be obtained before and after changing of the speed ratio. Accordingly, the output horsepower of the engine 21 transitions on the equal horsepower curve. Additionally, the power transmission 24 consequently applies the torque Te to the input shaft 61, and the matching point of the engine 21 settles at the first matching point Pma1. Therefore, at time t4, the engine controlling unit 50 is capable of applying a positive valued offset (+ΔNe11) to the rotational speed (Ne1−ΔNe11) of the engine 21 (the rotational speed of the input shaft 61). At this time, switching into the Lo mode has been determined by the clutch controlling unit 58, and hence, the speed ratio exists in the range of less than or equal to the first threshold Rs_th1. Moreover, the engine controlling unit 50 is capable of decreasing the output torque of the engine 21 from Te+ΔTe1 to Te.

As a result of the aforementioned action, the speed ratio has a negative offset at or after time t4. In other words, in the Lo mode set by mode switching, the speed ratio is deviated from the mode switching threshold Rs_th1. Consequently, even when slightly fluctuating at or after time t4 as shown in FIG. 9, the speed ratio is unlikely to get higher than the first threshold Rs_th1. As a result, hunting is prevented that is caused by switching the transmission path into the Lo mode and then immediately switching the transmission path from the Lo mode to the Hi mode.

Second Exemplary Embodiment

Figure 10:
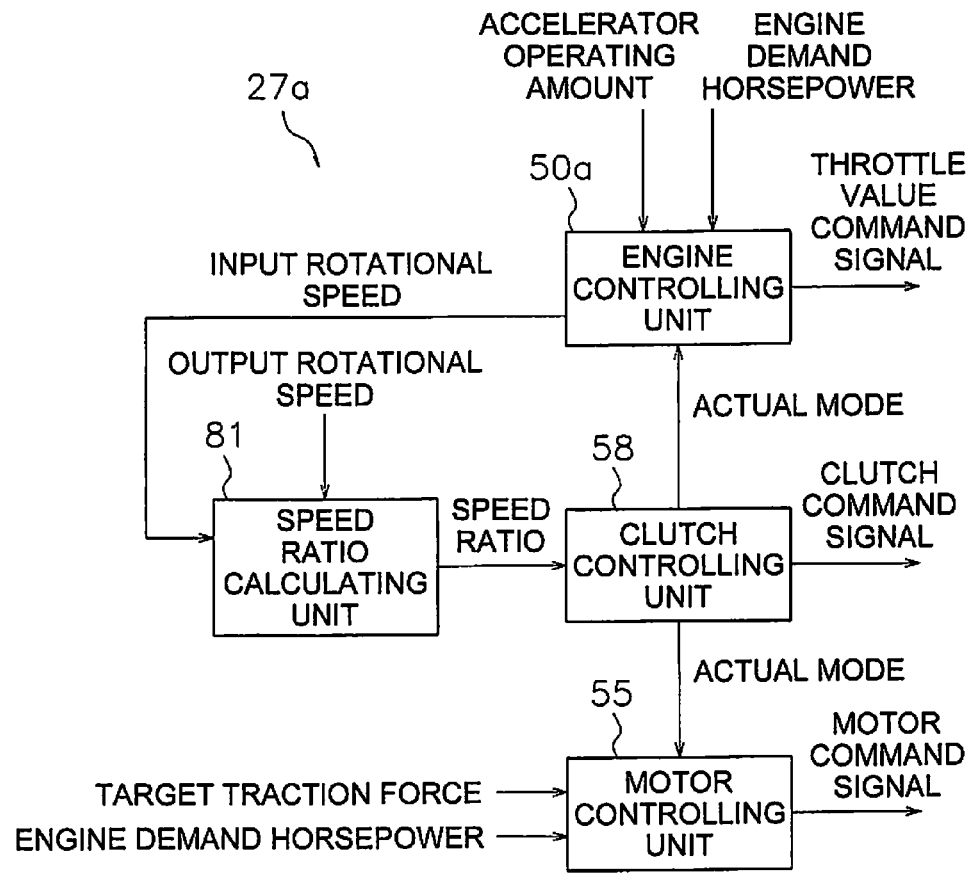
FIG. 10 is a block diagram showing a detailed internal structure of a controller according to a second exemplary embodiment.

FIG. 10 is a block diagram showing a detailed internal structure of a controller 27a according to a second exemplary embodiment. Excluding an action of an engine controlling unit 50a, actions of the respective elements in the second exemplary embodiment are the same as those of the respective elements in first exemplary embodiment. Therefore, only the action of the engine controlling unit 50a will be explained in detail.

When the speed ratio falls into a predetermined range about the first threshold Rs_th1 after mode switching is performed, the engine controlling unit 50a outputs the throttle value command signal for changing the rotational speed of the engine 21 (i.e., the input rotational speed of the power transmission 24) to the fuel injection device 21C on the basis of the accelerator operating amount, the engine demand horsepower based on the operating amount of the work implement operating member 52a and the vehicle speed, and the actual mode obtained from the signal transmitted from the clutch controlling unit 58 and so forth. The target traction force is maintained even when mode switching is performed by the motor controlling unit 55. Hence, the vehicle speed is constant when the target traction force and the resistance of the road surface are balanced, and the output rotational speed is kept unchanged. In such a case, when the input rotational speed is changed by the engine controlling unit 50a, the speed ratio is changed to deviate from the first threshold Rs_th1.

Next, how the engine controlling unit 50a herein changes the rotational speed and the torque of the engine 21 will be explained. As shown in FIG. 8, in the present exemplary embodiment, the engine controlling unit 50a utilizes three regulation lines La1, La2 and La3. The regulation line La1 corresponds to a standard regulation line under the condition that no offset is applied to the engine rotational speed, and is obtained by a similar method to the first exemplary embodiment. The regulation line La2 is utilized when the speed ratio varies in a range from the first threshold Rs_th1 to a third threshold Rs_th1+D1 (see FIG. 11) after switching from the Lo mode to the Hi mode. The regulation line La3 is utilized as a matching point utilized when the speed ratio varies in a range from the first threshold Rs_th1 to a fourth threshold Rs_th1−D2 (see FIG. 12) after switching from the Hi mode to the Lo mode. It should be noted that D1 and D2 are both positive values, and the following relation is established: the fourth threshold Rs_th1−D2<the first threshold Rs_th1<the third threshold Rs_th1+D1. Additionally, an interval D2 between the first threshold and the fourth threshold may be equal to or different from an interval D1 between the first threshold and the third threshold.

Figure 11:
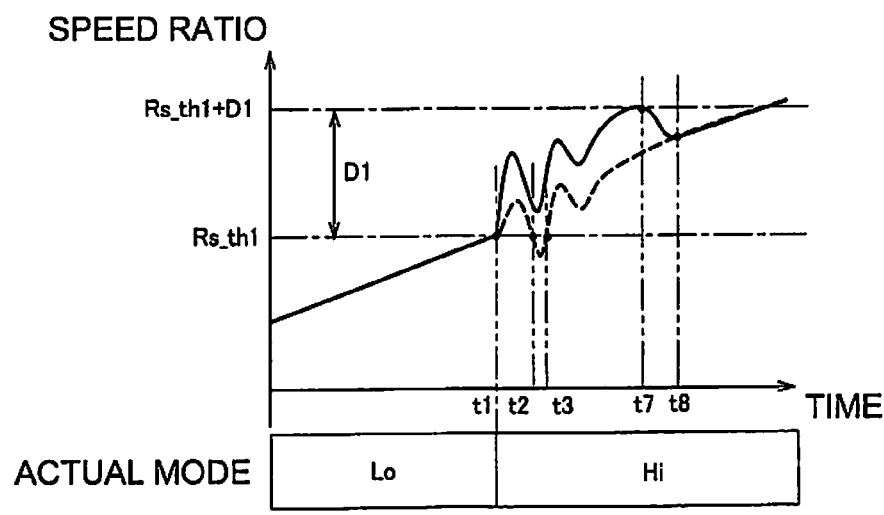
FIG. 11 is a chart showing an example of time-series variation in speed ratio and mode of a work vehicle according to the second exemplary embodiment.
Figure 12:
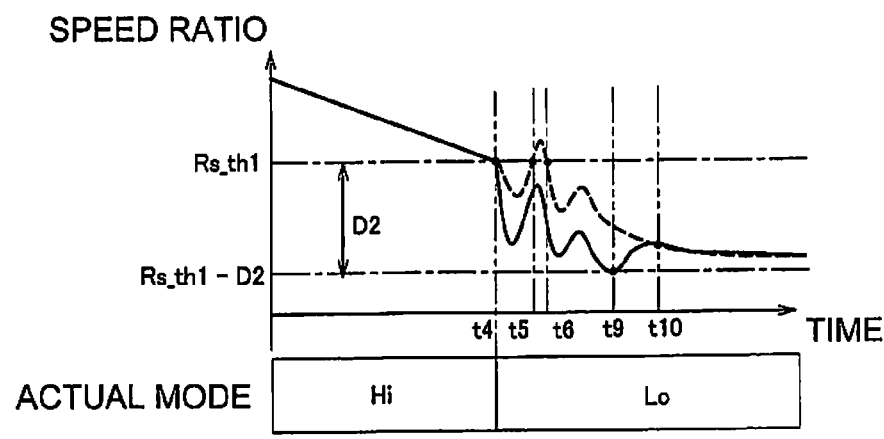
FIG. 12 is a chart showing an example of time-series variation in speed ratio and mode of the work vehicle according to the second exemplary embodiment.

Next, detailed actions of the engine controlling unit 50a and the motor controlling unit 55 in mode switching will be explained in detail with reference to drawings. FIG. 11 is a chart showing an example of time-series variation in speed ratio and mode of the work vehicle 1 according to the second exemplary embodiment in switching from the Lo mode to the Hi mode. FIG. 11 shows time-series variation in speed ratio and mode when the work vehicle 1 travels under the same condition as FIG. 15. FIG. 11 herein depicts transition of the speed ratio in FIG. 15 with a dashed line for easy comparison with the action in FIG. 15. FIG. 12 is a chart showing an example of time-series variation in speed ratio and mode of the work vehicle 1 according to the second exemplary embodiment in switching from the Hi mode to the Lo mode. It should be noted that switching from the Lo mode to the Hi mode is assumed to be performed at time t1 in FIG. 11, whereas switching from the Hi mode to the Lo mode is assumed to be performed at time t4 in FIG. 12.

In FIG. 11, until time t1, the engine controlling unit 50a performs a control of making the output torque of the engine 21 transition on the standard regulation line La1. Then, an intersection between the standard regulation line La1 and the equal horsepower curve Lhdm of the engine demand horsepower inputted into the engine controlling unit 50a is obtained as the first matching point Pma1 (see FIG. 8). The motor controlling unit 55 controls the torque of the motor MG1, MG2 on the basis of the torque value Te in the first matching point Pma1 to obtain the target traction force. As a result of the control, the power transmission 24 applies the torque Te to the input shaft 61, and the matching point of the engine 21 settles at the first matching point Pma1. Therefore, the torque of the input shaft settles at Te, and the rotational speed of the input shaft 61 settles at Ne1.

At time t1, in accordance with switching from the Lo mode to the Hi mode, the engine controlling unit 50a decreases the throttle value of the engine 21 determined as described above by a small amount. As a result, the idling engine rotational speed is changed from Ne to Ne−ΔNe1. Therefore, the engine controlling unit 50a performs a control of making the output torque of the engine 21 transition on the regulation line La2 determined by the throttle value of the engine 21 corresponding to the idling engine rotational speed (Ne−ΔNe1). Next, the motor controlling unit 55 determines a torque value (Te1−ΔTe1) on the basis of (Equation 1) and a constraint condition of the regulation line La2 such that the engine demand horsepower is kept unchanged before and after changing of the engine rotational speed (the rotational speed of the input shaft 61) even when mode switching is performed. When the torque value (Te+ΔTe1) in the second matching point Pma2 is determined, the motor controlling unit 55 controls the torque of the motor MG1, MG2 such that the target traction force can be obtained before and after changing of the speed ratio on the basis of the output torque (Te+ΔTe1) of the engine 21 obtained from the engine controlling unit 50a. Accordingly, the output horsepower of the engine 21 transitions on the equal horsepower curve. Additionally, the power transmission 24 consequently applies the torque (Te+ΔTe1) to the input shaft 61, and the matching point of the engine 21 settles at the second matching point Pma2. Therefore, at time t1, the engine controlling unit 50a is capable of applying a negative valued offset (−ΔNe11) to the rotational speed Ne1 of the engine 21 (the rotational speed of the input shaft 61). At this time, switching into the Hi mode has been determined by the clutch controlling unit 58, and hence, the speed ratio exists in the range of greater than or equal to the first threshold Rs_th1. Moreover, the output torque of the engine 21 can be increased from Te to Te+ΔTe1.

As a result of the aforementioned action, as shown in FIG. 11, the speed ratio has a positive offset from time t1 to time t8. That is, in the Hi mode set by mode switching, the speed ratio is deviated from the mode switching threshold Rs_th1. It should be noted that at time t7, the speed ratio has reached the third threshold Rs_th1+D1, and hence, the engine controlling unit 50a finishes applying the negative valued offset (−ΔNe11) to the rotational speed Ne1 of the engine 21 (the rotational speed of the input shaft 61). In other words, the engine controlling unit 50a finishes applying the offset to the rotational speed of the engine 21 (the rotational speed of the input shaft 61) when the speed ratio deviates from the first threshold Rs_th1 by a predetermined magnitude D1 or greater. Specifically, the engine controlling unit 50a increases the throttle value of the engine 21 such that the idling engine rotational speed is changed from Ne−ΔNe1 to Ne (see FIG. 8). The engine controlling unit 50a performs a control of making the output torque of the engine 21 transition on the regulation line La1 determined by the throttle value of the engine 21 corresponding to the idling engine rotational speed (Ne). The motor controlling unit 55 determines the torque value Te on the basis of (Equation 1) and the constraint condition of the regulation line La1 such that the engine demand horsepower is kept unchanged before and after changing of the engine rotational speed (the rotational speed of the input shaft 61) even when mode switching is performed. When the torque Te in the first matching point Pma1 is calculated, the motor controlling unit 55 controls the torque of the motor MG1, MG2 on the basis of the output torque Te of the engine 21 obtained from the engine controlling unit 50a such that the target traction force can be obtained before and after changing of the speed ratio. Accordingly, the output horsepower of the engine 21 transitions on the equal horsepower curve. Additionally, the power transmission 24 consequently applies the torque Te to the input shaft 61, and the matching point of the engine 21 settles at the first matching point Pma1. Therefore, at time t7, the engine controlling unit 50a is capable of finishing applying the negative valued offset (−ΔNe11) to the rotational speed Ne1 of the engine 21 (the rotational speed of the input shaft 61). Moreover, the engine controlling unit 50a is capable of decreasing the output torque of the engine 21 from Te+ΔTe1 to Te.

As a result of the aforementioned action, the speed ratio has no offset at or after time t7. Consequently, as shown in FIG. 11, at time t8 subsequent to time t7, the value of the speed ratio becomes equal to that of the speed ratio obtained when the control of the speed ratio according to the present exemplary embodiment is not performed. In other words, the engine controlling unit 50a finishes applying the offset to the speed ratio of the power transmission 24 when the speed ratio deviates from the first threshold Rs_th1 by the predetermined magnitude D1 or greater.

In FIG. 12, until time t4, the engine controlling unit 50a performs a control of making the output torque of the engine 21 transition on the standard regulation line La1. Then, an intersection between the standard regulation line La1 and the equal horsepower curve Lhdm of the engine demand horsepower inputted into the engine controlling unit 50a is obtained as the first matching point Pma1 (see FIG. 8). The motor controlling unit 55 controls the torque of the motor MG1, MG2 such that the target traction force can be obtained on the basis of the torque value Te in the first matching point Pma1. As a result of the control, the power transmission 24 applies the torque Te to the input shaft 61, and the matching point of the engine 21 settles at the first matching point Pma1. Therefore, the torque of the input shaft 61 settles at Te, and the rotational speed of the input shaft 61 settles at Ne1.

At time t4, in accordance with switching from the Hi mode to the Lo mode, the engine controlling unit 50a increases the throttle value of the engine 21 determined as described above by a small amount. As a result, the idling engine rotational speed is changed from Ne to Ne+ΔNe2. The engine controlling unit 50a performs a control of making the output torque of the engine 21 transition on the regulation line La3 determined by the throttle value of the engine 21 corresponding to the idling engine rotational speed (Ne+ΔNe2). Next, the motor controlling unit 55 determines a torque value (Te−ΔTe2) such that the engine demand horsepower is kept unchanged before and after changing of the engine rotational speed (the rotational speed of the input shaft 61) even when mode switching is performed. In this case, the following (Equation 2) is established by utilizing the rotational speed Ne1 of the input shaft 61 in the first matching point Pma1 and the torque Te in the first matching point.

$$(Ne1+\Delta Ne12) \times (Te - \Delta Te2) = Ne1 \times Te \qquad \text{(Equation 2)}$$

In (Equation 2), (Ne1+ΔNe12) is the rotational speed of the input shaft 61 in the third matching point Pma3 plotted on the regulation line La3. A point (Ne1+ΔNe12, Te−ΔTe2) is plotted on the regulation line La3, and therefore, the motor controlling unit 55 is capable of calculating a torque (Te−ΔTe2) in the third matching point Pma3. When the torque value (Te−ΔTe2) in the third matching point Pma3 is determined, the motor controlling unit 55 controls the torque of the motor MG1, MG2 on the basis of the calculated torque value (Te−ΔTe2) such that the target traction force can be obtained before and after changing of the speed ratio. Accordingly, the output horsepower of the engine 21 transitions on the equal horsepower curve. Additionally, the power transmission 24 consequently applies the torque (Te−ΔTe2) to the input shaft 61, and the matching point of the engine 21 settles at the third matching point Pma3. Therefore, at time t4, the engine controlling unit 50a is capable of applying a positive valued offset (+ΔNe12) to the rotational speed Ne1 of the engine 21 (the rotational speed of the input shaft 61). At this time, switching into the Lo mode has been determined by the clutch controlling unit 58, and hence, the speed ratio exists in the range of less than or equal to the first threshold Rs_th1. Moreover, the engine controlling unit 50a is capable of decreasing the output toque of the engine 21 from Te to Te−ΔTe2. It should be noted that the magnitude of ΔNe1 and that of ΔNe2 may be equal to or different from each other, and the magnitude of ΔTe1 and that of ΔTe2 may be equal to or different from each other.

As a result of the aforementioned action, as shown in FIG. 12, the speed ratio has a negative offset from time t4 to time t10. That is, in the Lo mode set by mode switching, the speed ratio deviates from the mode switching threshold Rs_th1. It should be noted that at time t9, the speed ratio has reached the fourth threshold Rs_th1-D2, and hence, the engine controlling unit 50a finishes applying the positive valued offset (+ΔNe12) to the rotational speed Ne1 of the engine 21 (the rotational speed of the input shaft 61). In other words, the engine controlling unit 50a finishes applying the offset to the rotational speed of the engine 21 (the rotational speed of the input shaft 61) when the speed ratio deviates from the first threshold Rs_th1 by the predetermined magnitude D2. Specifically, the engine controlling unit 50a decreases the throttle value of the engine 21 such that the idling engine rotational speed is changed from Ne+ΔNe2 to Ne (see FIG. 8). The engine controlling unit 50a performs a control of making the output torque of the engine 21 transition on the regulation line La1 determined by the throttle value of the engine 21 corresponding to the idling engine rotational speed (Ne). The motor controlling unit 55 determines the torque value Te on the basis of (Equation 2) and the constraint condition of the regulation line La1 such that the engine demand horsepower is kept unchanged before and after changing of the engine rotational speed (the rotational speed of the input shaft 61) even when mode switching is performed. When the torque Te in the first matching point Pma1 is calculated, the motor controlling unit 55 controls the torque of the motor MG1, MG2 on the basis of the output torque Te of the engine 21 obtained from the engine controlling unit 50a such that the target traction force can be obtained before and after changing of the speed ratio. Accordingly, the output horsepower of the engine 21 transitions on the equal horsepower curve. Additionally, the power transmission 24 consequently applies the torque Te to the input shaft 61, and the matching point of the engine 21 settles at the first matching point Pma1. Therefore, at time t9, the engine controlling unit 50a is capable of finishing applying the positive offset (+ΔNe12) to the rotational speed Ne1 of the engine 21 (the rotational speed of the input shaft 61). Moreover, the engine controlling unit 50a is capable of increasing the output torque of the engine 21 from Te−ΔTe2 to Te.

As a result of the aforementioned action, the speed ratio has no offset at or after time t9. Consequently, as shown in FIG. 12, at time t10 subsequent to time t9, the value of the speed ratio becomes equal to that of the speed ratio obtained when the control of the speed ratio according to the present exemplary embodiment is not performed. In other words, the engine controlling unit 50a finishes applying the offset to the speed ratio of the power transmission 24 when the speed ratio deviates from the first threshold Rs_th1 by the predetermined magnitude D2 or greater.

Similarly in the present exemplary embodiment, the engine controlling unit 50a performs a control of making the speed ratio deviate from the first threshold Rs_th1 until the speed ratio sufficiently deviates from the first threshold Rs_th1. As a result, a type of hunting is prevented that is caused by switching the transmission path into the Lo mode and then immediately switching the transmission path from the Lo mode to the Hi mode, or another type of hunting is prevented that is caused by switching the transmission path into the Hi mode and then immediately switching the transmission path from the Hi mode to the Lo mode.

The features of the work vehicle 1 according to the present exemplary embodiments are as follows.

The controller 27, 27a is configured to keep unchanged the horsepower outputted from the engine and simultaneously to apply an offset to the rotational speed of the input shaft such that after mode switching is performed, the speed ratio parameter deviates from the mode switching threshold in the mode set by mode switching. Therefore, hunting can be inhibited which is caused by switching the transmission path into one mode and then immediately switching the transmission path from the one mode to another mode.

When the mode set as a result of switching by the clutch controlling unit 58 is the Lo mode (i.e., when the speed ratio exists in the range of less than or equal to the mode switching threshold Rs_th1), the engine controlling unit 50, 50a is configured to set the offset to have a positive value. Contrarily, when the mode set as a result of switching by the clutch controlling unit 58 is the Hi mode (i.e., when the speed ratio exists in the range of greater than or equal to the mode switching threshold Rs_th1), the engine controlling unit 50, 50a is configured to set the offset to have a negative value. With such structure, the speed ratio has a negative offset in switching from the Hi mode to the Lo mode, whereas the speed ratio has a positive offset in switching from the Lo mode to the Hi mode. Therefore, the speed ratio is changed so as to deviate from the mode switching threshold Rs_th1 after mode switching is performed.

The engine controlling unit 50a is configured to finish applying an offset when the speed ratio deviates from the mode switching threshold Rs_th1 by the predetermined magnitude D1, D2 or greater. As long as the matching curve Lma in a normal condition (a condition that no offset is applied to the engine rotational speed) is set to pass through a region in which the fuel consumption of the engine is low, matching is frequently done on the matching curve Lma. Hence, the work vehicle 1 is enhanced in fuel consumption.

Exemplary embodiments of the present invention have been explained. However, the present invention is not limited to the aforementioned exemplary embodiments, and a variety of changes can be made without departing from the scope of the present invention.

The present invention is not limited to the aforementioned wheel loader, and may be applied to another type of work vehicle, such as a bulldozer, a tractor, a forklift or a motor grader.

The present invention can be applied to not only the EMT but also another type of transmission such as the HMT. In this case, the first motor MG1 functions as a hydraulic motor and a hydraulic pump. Likewise, the second motor MG2 functions as a hydraulic motor and a hydraulic pump. The first motor MG1 and the second motor MG2 are variable displacement pumps/motors, and displacements thereof are configured to be controlled when the tilt angles of the swashplates or the tilting shafts thereof are controlled by the controller 27. Additionally, the displacements of the first motor MG1 and the second motor MG2 are controlled such that command torques calculated similarly to the aforementioned exemplary embodiments are outputted.

The speed ratio calculating unit 81 may be configured not only to calculate the present speed ratio on the basis of the present input rotational speed and the present output rotational speed but also to calculate the speed ratio on the basis of another parameter. For example, the speed ratio calculating unit 81 may be configured to calculate the speed ratio of the power transmission 24 on the basis of the rotational speed of the L clutch CL and that of the H clutch CH. Alternatively, the speed ratio calculating unit 81 may be configured to calculate the speed ratio of the power transmission 24 on the basis of the rotational speed of the first motor MG1 and that of the second motor MG2.

Moreover, the speed ratio calculating unit 81 may be configured to calculate another parameter corresponding to the speed ratio. Such a parameter is referred to as a speed ratio parameter. The clutch controlling unit 58 may be configured to utilize the speed ratio parameter. With reference to FIG. 4, the speed ratio is derived by obtaining information regarding which of the Hi mode and the Lo mode is currently set and the rotational speed ratio of either of the motors MG1 and MG. Hence, for instance, the following can be utilized as the speed ratio parameter: the rotational speed ratio of the motor MG1; the rotational speed ratio of the motor MG2; and a ratio between the rotational speed of the shaft or gear of the power transmission 24, which depends on the rotational speed of either of the motors MG1 and MG2, and the rotational speed of the input shaft 61. The controller 27 is capable of performing similar processing to the aforementioned exemplary embodiments by performing the aforementioned processing with use of values of the speed ratio parameter respectively corresponding to the aforementioned mode switching threshold Rs_th1 and the aforementioned second to fourth thresholds.

Furthermore, the speed ratio calculating unit 81 may be configured to calculate an estimated clutch engaged time required for clutch engagement on the basis of the clutch oil temperature and the engine rotational speed, and may be configured to output a prospective speed ratio to be estimated on the basis of the estimated clutch engaged time.

Switching between the Lo mode and the Hi mode may not be necessarily performed at the first threshold Rs_th1. It should be noted that when switching between the Lo mode and the Hi mode is performed at a value of the speed ratio other than the first threshold Rs_th1, the motor rotational speed is supposed to acutely vary in mode switching, and by the effect of this, adverse effects are even caused, such as acute variation in rotations of the input and output shafts or shortening of clutch life. Therefore, it is preferred to perform switching between the Lo mode and the Hi mode at the first threshold Rs_th1.

In the first exemplary embodiment, the regulation line La1 may be utilized as the standard regulation line utilized in the Hi mode, whereas the regulation line La3 may be utilized as the regulation line utilized in the Lo mode. In other words, the engine controlling unit 50 may be configured to change the regulation line from La1 to La3 in accordance with switching from the Hi mode to the Lo mode. In this case, it is preferred that the engine controlling unit 50 applies a positive valued offset (+ΔNe12) to the rotational speed Ne1 of the engine 21 (the input rotational speed of the input shaft 61) in switching from the Hi mode to the Lo mode.

Additionally, in the aforementioned exemplary embodiments, the power transmission having two modes composed of the Hi mode and the Lo mode has been exemplified, but the present invention may be applied to a power transmission that is provided with a third clutch other than the H clutch CH and the L clutch CL and thus has three or more modes.

Figure 13:
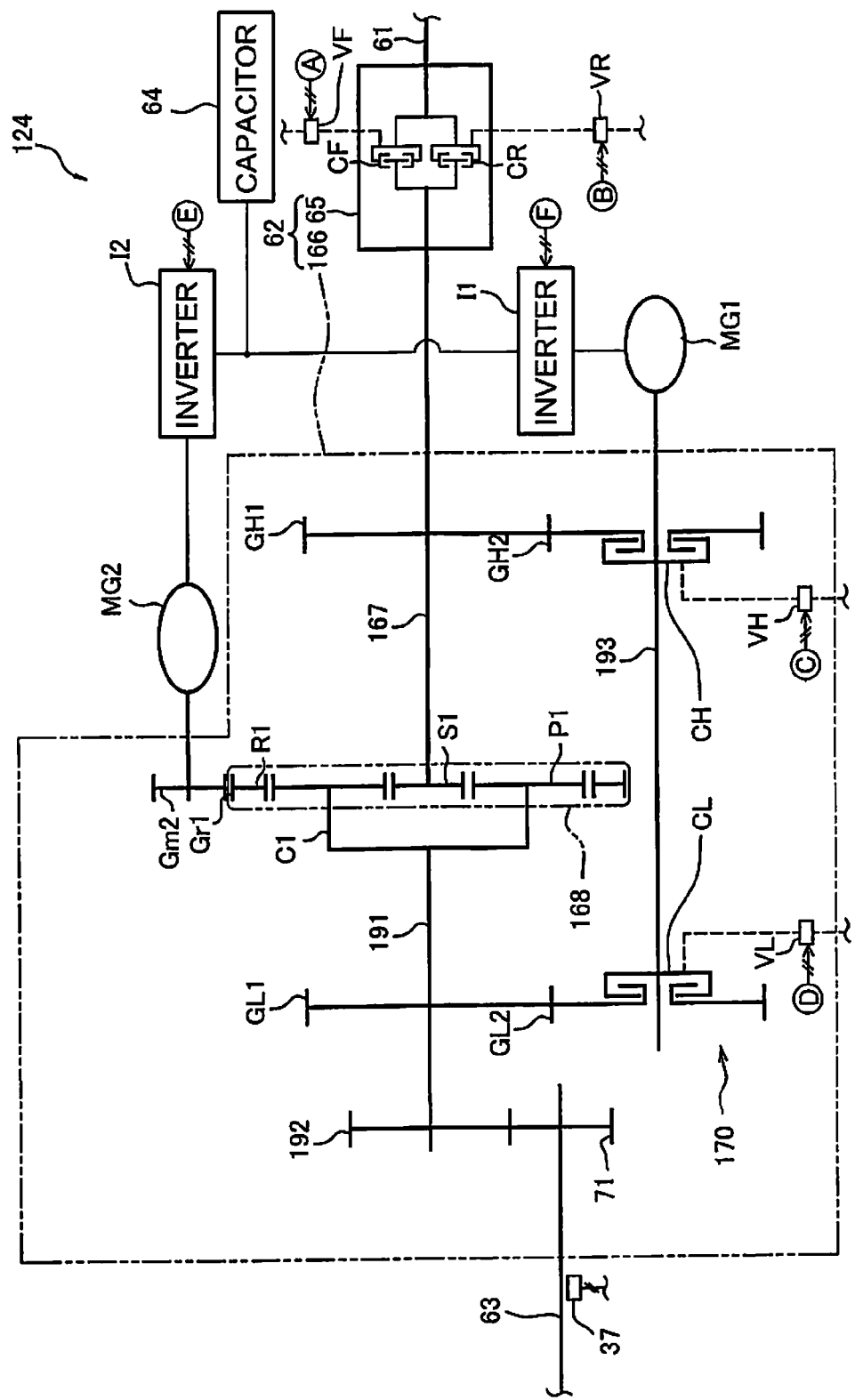
FIG. 13 is a schematic diagram showing a structure of a power transmission according to another exemplary embodiment.

The aforementioned power transmission 24 includes the first planetary gear mechanism 68 and the second planetary gear mechanism 69. However, the number of the planetary gear mechanisms provided for the power transmission is not limited to two. The power transmission may be provided with only one planetary gear mechanism. Alternatively, the power transmission may be provided with three or more planetary gear mechanisms. FIG. 13 is a schematic diagram of a structure of a power transmission 124 with which a work vehicle according to another exemplary embodiment is provided. The other constituent elements of the work vehicle according to another exemplary embodiment are similar to those of the work vehicle 1 according to the aforementioned exemplary embodiments, and hence, the detailed explanation thereof will not be described. Additionally, in FIG. 13, the same reference signs are assigned to the same constituent elements as those of the power transmission 24 according to the aforementioned exemplary embodiments.

As shown in FIG. 13, the power transmission 124 includes a gearshift mechanism 166. The gearshift mechanism 166 includes a planetary gear mechanism 168, a first transmission shaft 167, a second transmission shaft 191 and a second transmission shaft gear 192. The first transmission shaft 167 is coupled to the forward/rearward movement switch mechanism 65. The planetary gear mechanism 168 and the second transmission shaft gear 192 are disposed coaxially to the first transmission shaft 167 and the second transmission shaft 191.

The planetary gear mechanism 168 includes a sun gear S1, a plurality of planet gears P1, a carrier C1 supporting the plural planet gears P1, and a ring gear R1. The sun gear S1 is coupled to the first transmission shaft 167. The plural planet gears P1 are meshed with the sun gear S1, and are rotatably supported by the carrier C1. The carrier C1 is fixed to the second transmission shaft 191. The ring gear R1 is meshed with the plural planet gears P1 and is rotatable. Additionally, a ring outer peripheral gear Gr1 is provided on the outer periphery of the ring gear R1. The second motor gear Gm2 is fixed to the output shaft of the second motor MG2, and is meshed with the ring outer peripheral gear Gr1.

The second transmission shaft gear 192 is coupled to the second transmission shaft 191. The second transmission shaft gear 192 is meshed with the output gear 71, and the rotation of the second transmission shaft gear 192 is outputted to the output shaft 63 through the output gear 71.

The gearshift mechanism 166 includes a first high speed gear (hereinafter referred to as "a first H gear GH1"), a second high speed gear (hereinafter referred to as "a second H gear GH2"), a first low speed gear (hereinafter referred to as "a first L gear GL1"), a second low speed gear (hereinafter referred to as "a second L gear GL2"), a third transmission shaft 193 and a Hi/Lo switch mechanism 170.

The first H gear GH1 and the first L gear GL1 are disposed coaxially to the first transmission shaft 167 and the second transmission shaft 191. The first H gear GH1 is coupled to the first transmission shaft 167. The first L gear GL1 is coupled to the second transmission shaft 191. The second H gear GH2 is meshed with the first H gear GH1. The second L gear GL2 is meshed with the first L gear GL1. The second H gear GH2 and the second L gear GL2 are disposed coaxially to the third transmission shaft 193, and are disposed to be rotatable with respect to the third transmission shaft 193. The third transmission shaft 193 is coupled to the output shaft of the first motor MG1.

The Hi/Lo switch mechanism 170 is a mechanism for switching the driving force transmission path in the power transmission 24 between the high speed mode (the Hi mode) in which the vehicle speed is high and the low speed mode (the Lo mode) in which the vehicle speed is low. The Hi/Lo switch mechanism 170 includes the H clutch CH configured to be engaged in the Hi mode and the L clutch CL configured to be engaged in the Lo mode. The H clutch CH is configured to engage/disengage the second H gear GH2 and the third transmission shaft 193. On the other hand, the L clutch CL is configured to engage/disengage the second L gear GL2 and the third transmission shaft 193.

Figure 14:
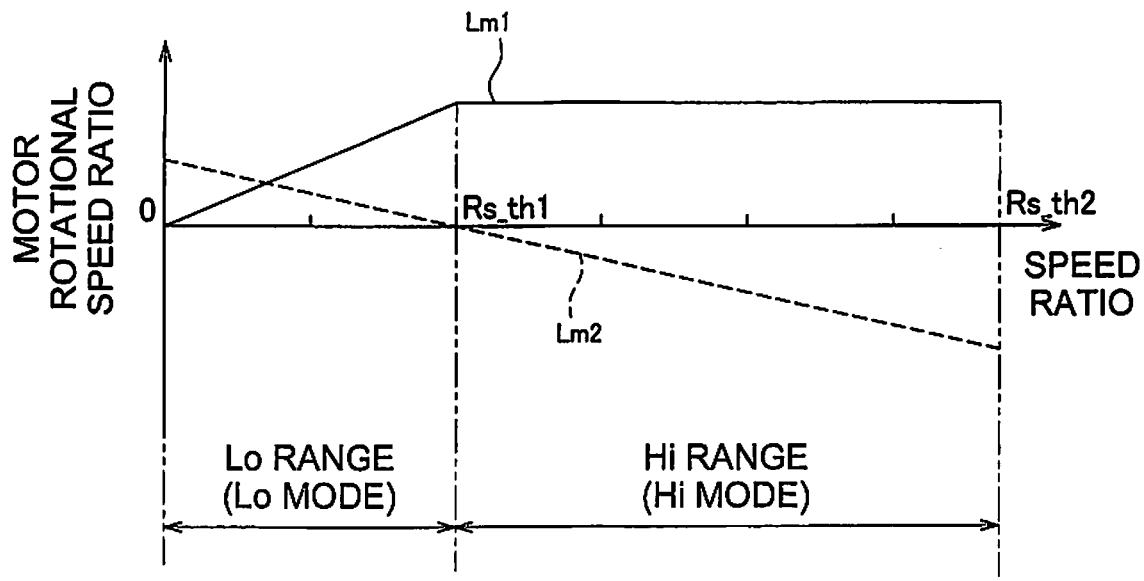
FIG. 14 is a diagram showing variation in rotational speed of a first motor and variation in rotational speed of a second motor with respect to a speed ratio of the power transmission according to another exemplary embodiment.

Next, an action of the power transmission 124 will be explained. FIG. 14 is a chart showing a rotational speed ratio of each motor MG1, MG2 with respect to a speed ratio in the power transmission 124. In FIG. 14, a solid line indicates the rotational speed ratio of the first motor MG1, whereas a dashed line indicates the rotational speed ratio of the second motor MG2. In the Lo range (the Lo mode) in which the speed ratio is greater than or equal to 0 and less than or equal to Rs_th1, the L clutch CL is engaged whereas the H clutch CH is disengaged. In the Lo range, the H clutch CH is disengaged, and thus, the second H gear GH2 and the third transmission shaft 193 are disconnected. On the other hand, the L clutch CL is engaged, and thus, the second L gear GL2 and the third transmission shaft 193 are connected.

In the Lo range, a driving force from the engine 21 is inputted into the sun gear S1 through the first transmission shaft 167, and is outputted to the second transmission shaft 191 from the carrier C1. On the other hand, the driving force inputted into the sun gear S1 is transmitted to the ring gear R1 from the planet gears P1, and is outputted to the second motor MG2 through the ring outer peripheral gear Gr1 and the second motor gear Gm2. In the Lo range, the second motor MG2 functions as a generator, and part of electric power generated by the second motor MG2 is stored in the capacitor 64.

Additionally, in the Lo range, the first motor MG1 functions as an electric motor. The driving force of the first motor MG1 is outputted to the second transmission shaft 191 through a path of the third transmission shaft 193, the second L gear GL2, and then the first L gear GL1. A net driving force, resulting from composition of the driving forces in the second transmission shaft 191 as described above, is transmitted to the output shaft 63 through the second transmission shaft gear 192 and the output gear 71.

In the Hi range (the Hi mode) in which the speed ratio exceeds Rs_th1, the H clutch CH is engaged whereas the L clutch CL is disengaged. In the Hi range, the H clutch CH is engaged, and hence, the second H gear GH2 and the third transmission shaft 193 are connected. On the other hand, the L clutch CL is disengaged, and thus, the second L gear GL2 and the third transmission shaft 193 are disconnected.

In the Hi range, the driving force from the engine 21 is inputted into the sun gear S1, and is outputted to the second transmission shaft 191 from the carrier C1. On the other hand, the driving force from the engine 21 is outputted to the first motor MG1 from the first H gear GH1 through the second H gear GH2 and the third transmission shaft 193. In the Hi range, the first motor MG1 functions as a generator, and thus, part of electric power generated by the first motor MG1 is stored in the capacitor 64.

On the other hand, the driving force of the second motor MG2 is outputted to the second transmission shaft 191 through a path of the second motor gear Gm2, the ring outer peripheral gear Gr1, the ring gear R1, and then the carrier C1. A net driving force, resulting from composition of the driving forces in the second transmission shaft 191, is transmitted to the output shaft 63 through the second transmission shaft gear 192 and the output gear 71.

A control of the power transmission 124 in the work vehicle according to another exemplary embodiment is similar to that of the power transmission 24 according to the aforementioned exemplary embodiments.

According to the present invention, it is possible to provide a work vehicle having a power transmission of an HMT or EMT type and a plurality of settings of transmission path for a driving force which inhibits hunting to be caused by frequently switching between the settings of transmission path, and to provide a method of controlling the work vehicle.

The invention claimed is:

1. A work vehicle, comprising:
 an engine;
 a hydraulic pump arranged and configured to be driven by the engine;
 a work implement arranged and configured to be driven by a hydraulic oil discharged from the hydraulic pump, the work implement including at least one hydraulic cylinder operatively arranged to be actuated by the hydraulic oil;
 a travelling apparatus including at least one axle and at least one wheel, the at least one axle and the at least one wheel being operatively arranged and configured to be driven by the engine;
 a power transmission configured to transmit a driving force from the engine to the travelling apparatus; and
 a controller configured to control the power transmission, the power transmission including
  an input shaft,
  an output shaft,
  a gear mechanism having a planetary gear mechanism, the gear mechanism being configured to transmit a rotation of the input shaft to the output shaft,
  a motor/generator connected to a rotary element of the planetary gear mechanism, the motor/generator being arranged such that a speed ratio of the output shaft to the input shaft changes in response to a change of a rotational speed of the motor,
  a first clutch for switching a transmission path for the driving force in the power transmission into a first mode, and
  a second clutch for switching the transmission path for the driving force in the power transmission into a second mode, the first mode being a mode in which the first clutch is engaged and the second clutch is disengaged, and the second mode being a mode in which the second clutch is engaged and the first clutch is disengaged, the power transmission being configured such that when a speed ratio parameter corresponding to the speed ratio of the output shaft to the input shaft is a predetermined mode switching threshold, a first rotational speed ratio of the motor to the input shaft in the first mode and a second rotational speed ratio of the motor to the input shaft in the second mode are equal to each other, the controller including a clutch controlling unit configured to determine which of the first mode and the second mode the transmission path will be switched into based on whether the speed ratio parameter is greater than or equal to the mode switching threshold or the speed ratio parameter is less than or equal to the mode switching threshold, and then output a clutch command signal for causing each of the first and second clutches to be engaged or disengaged corresponding to the determined mode, and an engine controlling unit configured to apply an offset to a rotational speed of the input shaft such that the speed ratio parameter deviates from the mode switching threshold for a prescribed period after the power transmission is switched into the determined mode, the controller being programmed to determine an output torque of the engine such that a horsepower outputted by the engine will be kept unchanged at least during the prescribed period, determine a target traction force based on a vehicle speed and an accelerator operating amount of the work vehicle, and control a torque of the motor/generator based on the determined output torque of the engine such that the target traction force is obtained during the prescribed period.

2. The work vehicle according to claim 1, wherein the engine controlling unit is configured to set the offset to have a positive value when the speed ratio parameter exists in a range of less than or equal to the mode switching threshold in the determined mode and is configured to set the offset to have a negative value when the speed ratio parameter exists in a range of greater than or equal to the mode switching threshold in the determined mode.

3. The work vehicle according to claim 2, wherein in changing the rotational speed of the input shaft, the engine controlling unit is configured to either increase a rotational speed of the engine and decrease the output torque of the engine or decrease the rotational speed of the engine and increase the output torque of the engine.

4. The work vehicle according to claim 1, wherein the engine controlling unit is configured to end the prescribed period and finish applying the offset when the speed ratio deviates from the mode switching threshold by a predetermined magnitude or greater.

5. The work vehicle according to claim 2, wherein the engine controlling unit is configured to finish applying the offset when the speed ratio deviates from the mode switching threshold by a predetermined magnitude or greater.

6. The work vehicle according to claim 3, wherein the engine controlling unit is configured to finish applying the offset when the speed ratio deviates from the mode switching threshold by a predetermined magnitude or greater.

7. A method of controlling a work vehicle equipped with a power transmission that includes an input shaft,
an output shaft,
a gear mechanism having a planetary gear mechanism, the gear mechanism being configured to transmit a rotation of the input shaft to the output shaft,
a motor/generator connected to a rotary element of the planetary gear mechanism, the motor/generator being arranged such that a speed ratio of the output shaft to the input shaft changes in response to a change of a rotational speed of the motor,
a first clutch for switching a transmission path for the driving force in the power transmission into a first mode, and
a second clutch for switching the transmission path for the driving force in the power transmission into a second mode, the first mode being a mode in which the first clutch is engaged and the second clutch is disengaged, and the second mode being a mode in which the second clutch is engaged and the first clutch is disengaged,
the power transmission being configured such that when a speed ratio parameter corresponding to the speed ratio of the output shaft to the input shaft is a predetermined mode switching threshold, a rotational speed ratio of the motor to the input shaft in the first mode and a rotational speed ratio of the motor to the input shaft in the second mode are equal to each other, the method comprising:

determining which of the first mode and the second mode the transmission path will be switched into based on whether the speed ratio parameter is greater than or equal to the mode switching threshold or the speed ratio parameter is less than or equal to the mode switching threshold, and then outputting a clutch command signal for causing each of the first and second clutches to be engaged or disengaged corresponding to the determined mode;

applying an offset to a rotational speed of the input shaft for a prescribed period after the power transmission is switched into the determined mode, the offset being applied such that the speed ratio parameter deviates from the mode switching threshold;

determining an output torque of the engine such that a horsepower outputted by the engine will be kept unchanged during the prescribed period;

determining a target traction force based on a vehicle speed and an accelerator operating amount of the work vehicle; and controlling a torque of the motor/generator based on the determined output torque of the engine such that the target traction force is obtained during the prescribed period.

* * * * *